(12) United States Patent
Bhaskaran et al.

(10) Patent No.: US 11,480,686 B2
(45) Date of Patent: Oct. 25, 2022

(54) IDENTIFYING AND/OR REMOVING FALSE POSITIVE DETECTIONS FROM LIDAR SENSOR OUTPUT

(71) Applicant: Zoox, Inc., Foster City, CA (US)

(72) Inventors: Sreevatsan Bhaskaran, San Jose, CA (US); Mehran Ferdowsi, San Mateo, CA (US); Ryan McMichael, Mountain View, CA (US); Subasingha Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 202 days.

(21) Appl. No.: 16/851,033

(22) Filed: Apr. 16, 2020

(65) Prior Publication Data

US 2020/0309957 A1 Oct. 1, 2020

Related U.S. Application Data

(63) Continuation-in-part of application No. PCT/US2020/014187, filed on Jan. 17, 2020.

(Continued)

(51) Int. Cl.
   *G01S 17/931* (2020.01)
   *G01S 7/4861* (2020.01)
   (Continued)

(52) U.S. Cl.
   CPC .......... *G01S 17/931* (2020.01); *G01S 7/484* (2013.01); *G01S 7/4861* (2013.01); *G01S 17/42* (2013.01); *G01S 17/86* (2020.01)

(58) Field of Classification Search
   CPC .. G01S 5/0226; G01S 5/02527; G01S 5/0273; G01S 5/04; G01S 5/0231;
   (Continued)

(56) References Cited

U.S. PATENT DOCUMENTS

| 10,107,899 B1 * | 10/2018 | Han ........................ G01S 7/497 |
| 2014/0324266 A1 * | 10/2014 | Zhu ....................... G01S 13/865 |
|  |  | 382/104 |

(Continued)

FOREIGN PATENT DOCUMENTS

| DE | 19717399 A1 | 6/1999 |
| DE | 102016104463 A1 * | 9/2016 ............. G01C 21/26 |

OTHER PUBLICATIONS

International Report on Preliminary Patentability for PCT Application No. PCT/US20/14187, dated Oct. 7, 2021.

(Continued)

*Primary Examiner* — Michael P Stafira
(74) *Attorney, Agent, or Firm* — Lee & Hayes, P.C.

(57) ABSTRACT

Particulate matter, such as dust, steam, smoke, rain, etc. may cause one or more sensor types to generate false positive detections. In particular, various depth measurements may be impeded by particulate matter. Identifying a false return and/or removing a false detection based at least in part on a sensor output may comprise determining a similarity of a portion of a return signal to an emitted light pulse or an expected return signal, determining a variance of the signal portion over time, determining a difference between a power spectrum of the return relative to an expected power spectrum, and/or determining that a duration associated with the signal portion meets or exceeds a threshold duration.

20 Claims, 8 Drawing Sheets

Related U.S. Application Data

(60) Provisional application No. 62/825,011, filed on Mar. 27, 2019.

(51) Int. Cl.
　　*G01S 7/484*　　　(2006.01)
　　*G01S 17/42*　　　(2006.01)
　　*G01S 17/86*　　　(2020.01)

(58) Field of Classification Search
　　CPC . G01S 5/163; G01S 7/28; G01S 7/288; G01S 7/32; G01S 7/4017; G01S 7/4056; G01S 7/4918; G01S 7/52003; G01S 7/5205; G01S 7/521; G01S 7/54; G01S 1/042; G01S 1/0423; G01S 1/7032; G01S 11/12; G01S 13/424; G01S 13/449; G01S 13/64; G01S 13/70; G01S 13/881; G01S 13/9023; G01S 13/935; G01S 13/951; G01S 15/588; G01S 19/03; G01S 19/07; G01S 19/15; G01S 19/23; G01S 2007/52009; G01S 2007/52011; G01S 2013/93277; G01S 3/7865; G01S 3/802; G01S 5/00; G01S 5/0054; G01S 5/017; G01S 5/02; G01S 5/021; G01S 5/02526; G01S 5/06; G01S 5/14; G01S 7/027; G01S 7/032; G01S 7/04; G01S 7/062; G01S 7/2806; G01S 7/295; G01S 7/36; G01S 7/4021; G01S 7/4043; G01S 7/4052; G01S 7/4091; G01S 7/4911; G01S 7/524
　　See application file for complete search history.

(56) References Cited

U.S. PATENT DOCUMENTS

| | | | |
|---|---|---|---|
| 2016/0178802 | A1 | 6/2016 | Stainvas Olshansky et al. |
| 2017/0176641 | A1* | 6/2017 | Zhu .................. G01W 1/14 |
| 2017/0307735 | A1 | 10/2017 | Rohani et al. |
| 2018/0284277 | A1* | 10/2018 | LaChapelle ............. G01S 17/89 |
| 2019/0257947 | A1* | 8/2019 | Zhang .................... G01S 17/89 |
| 2019/0285749 | A1* | 9/2019 | Chen ...................... G01S 7/487 |
| 2019/0293768 | A1* | 9/2019 | Subasingha ............. G01S 17/10 |
| 2019/0293769 | A1* | 9/2019 | Subasingha ........... G01S 7/4873 |
| 2019/0293770 | A1* | 9/2019 | Subasingha ........... G01S 7/4873 |
| 2020/0090322 | A1 | 3/2020 | Seo et al. |
| 2020/0189463 | A1 | 6/2020 | Kunz et al. |
| 2020/0225325 | A1* | 7/2020 | Kim ........................ G01S 17/10 |
| 2020/0249332 | A1 | 8/2020 | Pandey et al. |
| 2020/0278440 | A1* | 9/2020 | Wang ..................... G01S 13/584 |
| 2020/0284908 | A1* | 9/2020 | Paulsen ................. G01S 7/4808 |
| 2020/0300975 | A1* | 9/2020 | Okuni ..................... G01S 17/10 |
| 2020/0300990 | A1* | 9/2020 | Eichenholz ........... G01S 17/931 |
| 2020/0309923 | A1 | 10/2020 | Bhaskaran et al. |
| 2021/0011161 | A1 | 1/2021 | Chen et al. |

OTHER PUBLICATIONS

International Preliminary Report on Patentability for PCT Application No. PCT/US2020/014205, dated Oct. 7, 2021.

Filonenko, "Smoke Detection on Roads for Autonomous Vehicles", IECON 2014—40th Annual Conference of the IEEE Industrial Electronics Society, IEEE, Oct. 29, 2014, pp. 4063-4066.

PCT Search Report and Written Opinion dated May 12, 2020 for PCT Application No. PCT/US2020/014187, 11 pages.

PCT Search Report and Written Opinion dated Apr. 23, 2020 for PCT Application No. PCT/US2020/014205, 14 pages.

Torabnezhad et al., "Visible and IR image fusion algorithm for short range smoke detection", 2013 First RSI/ISM International Conference on Robotics and Mechatronics (ICROM), IEEE, Feb. 13, 2013, pp. 38-42.

Feiniu Yuan, "Video-based smoke detection with histogram sequence of LBP and LBPV pyramids", Fire Safety Journal, vol. 46, No. 3, Elsevier, Amsterdam, NL, Jan. 5, 2011, pp. 132-139.

* cited by examiner

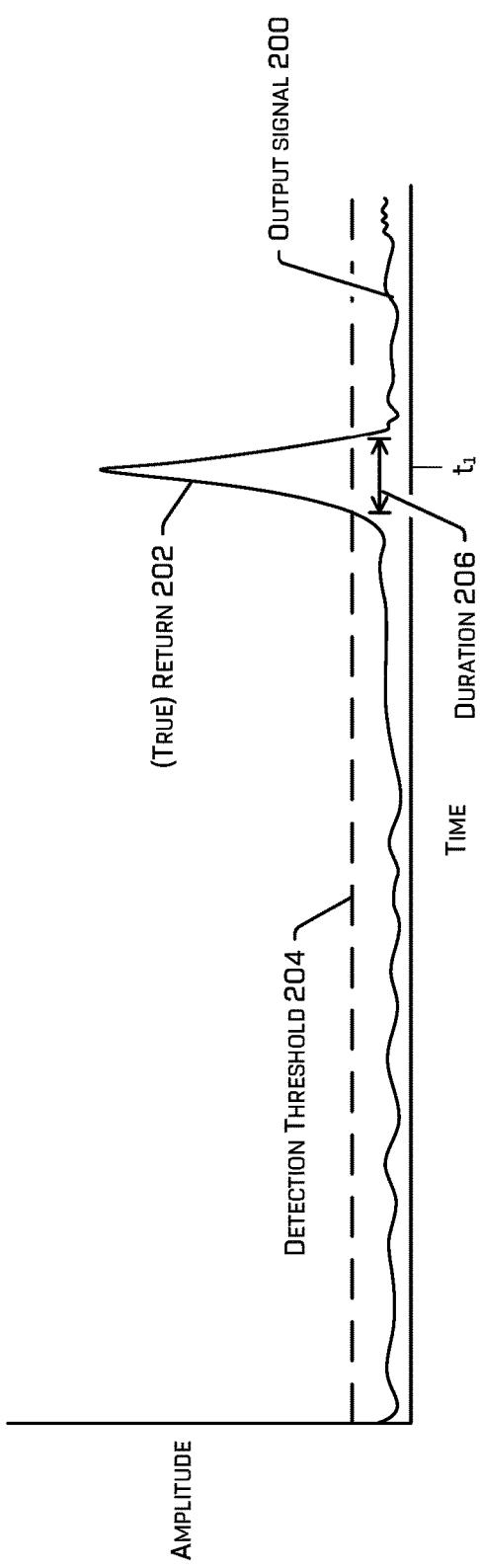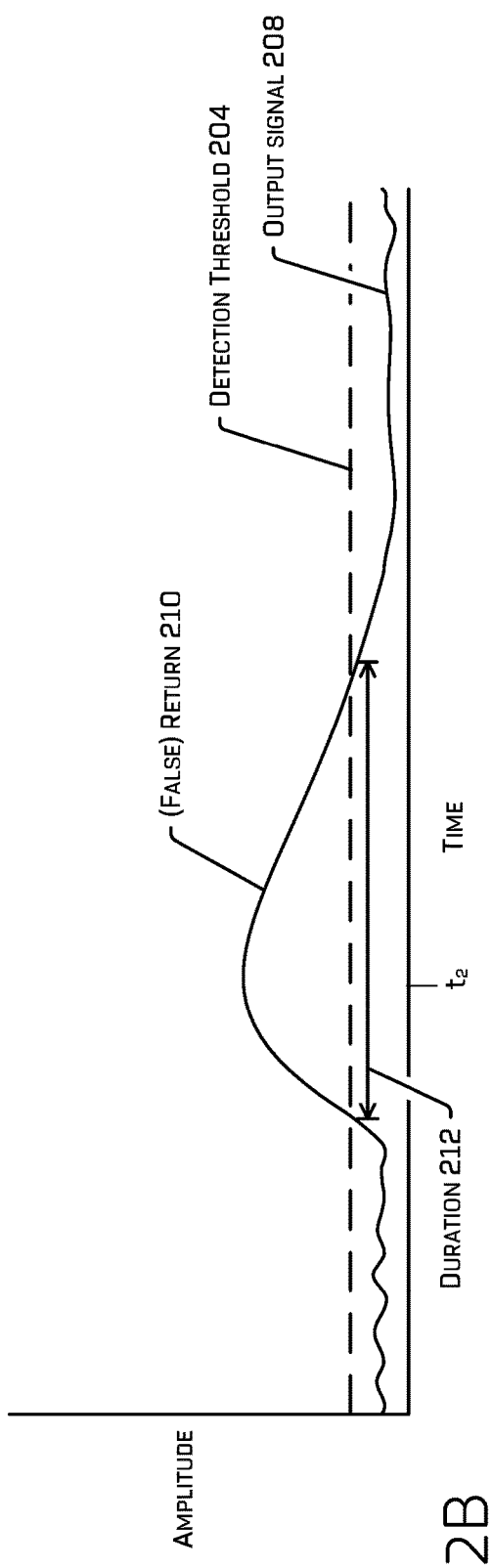
FIG. 2A
FIG. 2B

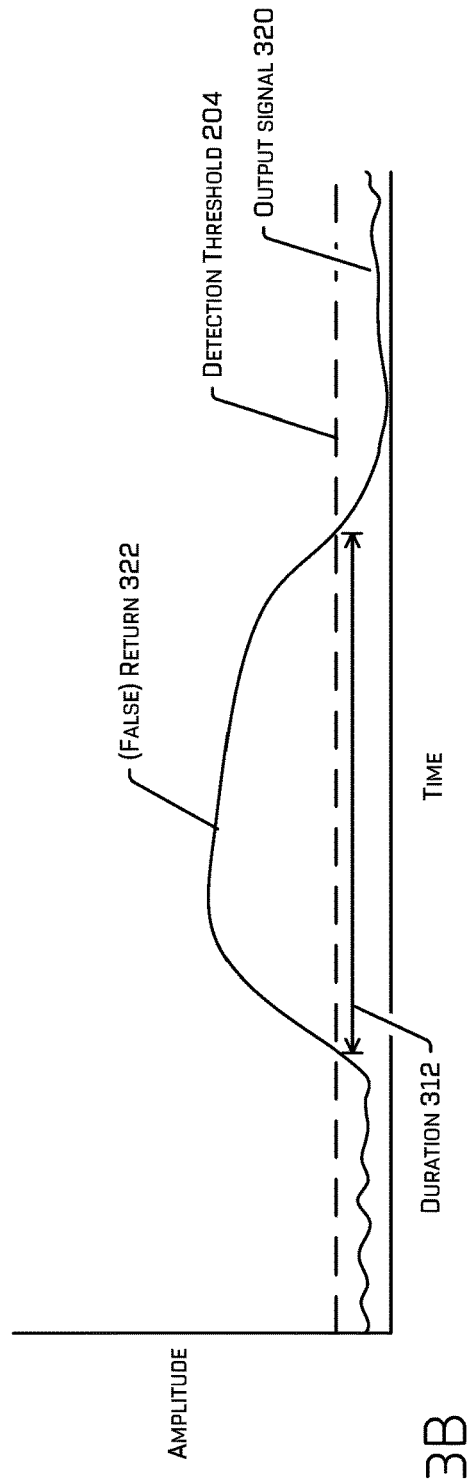
FIG. 3A
FIG. 3B

IDENTIFYING AND/OR REMOVING FALSE POSITIVE DETECTIONS FROM LIDAR SENSOR OUTPUT

RELATED APPLICATIONS

This application is a continuation-in-part of PCT Application No. US20/14187, filed Jan. 17, 2020, the entirety of which is incorporated herein, which claims the benefit of U.S. Provisional Application No. 62/825,011, filed Mar. 27, 2019, the entirety of which is incorporated herein. PCT Application No. US20/14187 further incorporates U.S. Provisional Application No. 62/800,386, filed Feb. 1, 2019, and U.S. application Ser. No. 16/276,327, filed Feb. 14, 2019, in their entirety.

BACKGROUND

Light detection and ranging or "LIDAR" refers to a technique for measuring distances to visible surfaces by emitting light and measuring properties of the reflections of the light. A LIDAR system has a light emitter and a light sensor. The light emitter may comprise a laser that directs light into an environment. When the emitted light is incident on a surface, a portion of the light is reflected and received by the light sensor, which converts light intensity to a corresponding electrical signal.

A LIDAR system has signal processing components that analyze reflected light signals to determine the distances to surfaces from which the emitted laser light has been reflected. For example, the system may measure the propagation time of a light signal as it travels from the laser emitter, to the surface, and back to the light sensor. A distance is then calculated based on the flight time and the known speed of light.

However, fine particulate matter may also reflect light. Problematically, fog, smoke, fog, exhaust, steam, and other such vapors may reflect light emitted by a LIDAR system. The LIDAR system may accordingly produce a false positive indication of the existence of a surface at the location of the vapor, even though no solid exists at the location.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 2A-3B illustrate signal diagrams of example output signals of a LIDAR channel, including false returns and true returns.

DETAILED DESCRIPTION

Figure 1A:
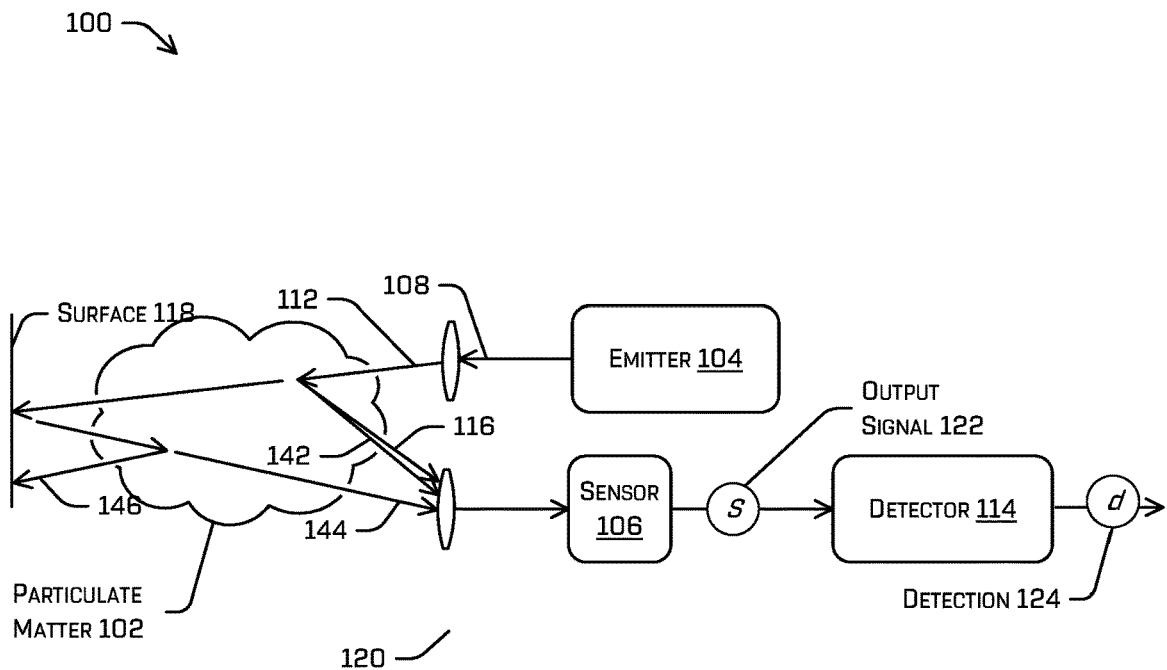
FIG. 1A illustrates a block diagram of components of an example LIDAR system, including reflected light attributable to particulate matter and a channel comprising an emitter/sensor pair.

The techniques discussed herein may comprise identifying a false return and/or removing (and/or otherwise ignoring, suppressing, and/or discarding) a false detection generated based at least in part on a light sensor's output signal(s). As used herein a false detection is a false positive indication that a surface exists in an environment surveyed by a light sensor such as, for example, a LIDAR device. In some examples, the false detection may be associated with a false return, which may be a false positive indication that a portion of an output signal of a sensor is associated with a "return," a signal generated responsive to a reflection of light emitted by an emitter of a same channel as the sensor. In some examples, a "return" may be a peak and/or other portion of a sensor signal that meets or exceeds a detection threshold. However, in at least some examples, such false positive indications may be associated with genuine returns but returns which have no impact on a solid object moving through (e.g., fog, smoke, exhaust, rain, etc.). In such examples, though the returns correspond to real material, they are false in the sense that they should be ignored in certain contexts (e.g., driving).

The techniques discussed herein may comprise techniques for determining that an output signal of a channel of a LIDAR device comprises a false return (i.e., "detecting" a false return) and/or techniques for suppressing a false detection associated with the false return. In particular, the techniques discussed herein may detect when particulate matter is causing a false return and/or a false detection. Particulate matter may cause false returns in LIDAR data locally (i.e., in a specific region observed by the LIDAR sensor) and/or totally (i.e., in an entire or near-total region observed by a LIDAR sensor). For example, local interference caused by particulate matter may include exhaust from a tailpipe of a vehicle, steam from a manhole cover, smoke from an engine, etc., whereas global interference may comprise fog, non-local smoke (e.g., smoke from a forest fire), non-local smog, rain, etc. The techniques discussed herein may comprise different techniques for detecting local and/or global interferences attributable to particulate matter, and the different techniques discussed herein may be conducted in any combination and/or singularly.

The techniques for detecting a false return may comprise techniques that are based at least in part on an output signal of single channel of a LIDAR device and/or depth measurement associated with the channel, output signals of multiple channels of a LIDAR device and/or depth measurements associated with the channels, output signal(s) of one or more LIDAR devices and/or depth measurements associated with the LIDAR device(s), a depth map generated based at least in part on the output signal(s) of one or more channels, and/or any combination thereof. In some examples, the techniques may additionally or alternatively comprise calculating a reflectivity associated with a return and/or comparing the calculated reflectivity to a threshold reflectivity.

For example, if the calculated reflectivity associated with a return is less than a threshold (as further determined according to any of the techniques disclosed herein), a perception component may increase a value of a likelihood calculated by the perception component that the return is a false return.

Detecting that an output signal includes a false return may comprise determining that a characteristic of at least a portion of the output signal fits a characteristic of a false return attributable to particulate matter. For example, this may include calculating a correlation between the output signal and an expected return signal (e.g., an artificial signal having properties associated with mean properties of an output signal comprising a true positive return signal). Detecting that the output signal includes a false return may additionally or alternatively include a spatial variance between depth measurements associated with multiple channels and/or depth map points generated for multiple channels. For example, determining a spatial variance may comprise determining a variance between distance measurements output by multiple channels over a scanned area and/or determining whether the variance over the scanned area meets or exceeds a variability threshold. A variance that meets or exceeds the variance threshold may indicate a higher likelihood that at least some of the detections corresponding to the scanned area are false detections. In some examples, the variance threshold may monotonically increase over distance. For example, the techniques may comprise determining a mean distance measurement associated with LIDAR points of a scanned area and setting the variance threshold based at least in part on the mean distance measurement (e.g., the variance threshold may increase as the mean distance measurement increases). In some examples, the techniques may comprise comparing a variance associated with a particular area/volume of a depth map generated in association with outputs of different channels and/or different LIDAR sensors.

Detecting that the output signal includes a false return may additionally or alternatively include varying the transmission power and/or frequency of emitted light and comparing signal characteristics between a first output signal corresponding to a lower power and/or lower frequency light emission and a second output signal corresponding to a higher power and/or higher frequency light emission. When the first output signal and second output signal resulted from reflections off a surface, the second output signal may comprise a return that exhibits increased power in comparison to a return in the first output signal, but may otherwise exhibit similar characteristics. Whereas, when the first output signal and the second output signal resulted from reflections off particulate matter, the second output signal may comprise an additional return portion in comparison to a first output signal and/or a return in the second output signal may be more "smeared" (e.g., the power of the return may be distributed over a greater amount of time) in comparison to a return in the first output signal. In other words, detecting a false return may comprise determining that temporal and/or spectral characteristics of the output signal of a channel change when the power and/or frequency of the emitted light are varied. In some examples, a first LIDAR sensor may operate at a first power and/or a first frequency and a second LIDAR sensor may operate at a second power and/or a second frequency. In an additional or alternate example, a LIDAR sensor may vary the power and/or frequency of operation per scan and/or per channel.

In an additional or alternate example, the transmission power may be constant or nearly constant (e.g., within technical tolerances). In some examples, the techniques may comprise differentiating between a false return caused by a reflective surface (e.g., a retroreflector) or a false return caused by particulate matter. For example, the techniques may comprise storing a data structure that indicates a relation (e.g., scalar value, function) between transmission power and a false return from a reflective surface, a false return from at least one type of particulate matter, and/or a true return from at least one type of surface. The relation may indicate, for example, that an exponential, logarithmic, polynomial, and/or other function between transmission power and the distribution of the return over time (e.g., a width of the return signal that meets or exceeds a threshold) and/or an amplitude associated therewith.

Detecting that the output signal includes a false return may additionally or alternatively include determining a correlation between outputs of two different LIDAR sensors. For example, the techniques may comprise determining a first depth measurement associated with a first LIDAR sensor that corresponds to a second depth measurement associated with a second LIDAR sensor (e.g., a first channel of the first LIDAR sensor took the first measurement in a direction that intersects a direction a second channel of the second LIDAR sensor took the second measurement). A perception component may compare the first depth measurement and the second depth measurement and determine whether a distance between a first point associated with the first depth measurement and a second point associated with the second depth measurement is less than a threshold distance. If the distance meets or exceeds the threshold distance, the perception component may suppress the first depth measurement and/or the second depth measurement as being a false detection.

In some examples, the techniques may comprise determining that an output signal generated by a sensor comprises multiple return signals, which may be portions of the output signal that meet or exceed a threshold amplitude and/or power. Determining that the output signal includes a false return may comprise comparing the multiple returns. For example, the techniques may comprise indicating that a first return (in time) is a false return based at least in part on determining that a second return (in time and corresponding to a distance further from the sensor than the first return) exists. In such an example the first return may be associated with something that is transparent and/or otherwise light permeable. In some examples, the techniques may comprise determining one or more returns in order of strength of the return signal.

Determining a false return and/or identifying a true return may be based at least in part on comparing the strengths of the returns in comparison to their order in time. For example, the sensor may output the four strongest return signals (e.g., signal portion(s) meeting or exceeding a threshold, peaks), although any other number of return signals may be used (e.g., one strongest, two strongest, three strongest, five strongest). In at least one example, the techniques may comprise identifying a first (in time) of n return signals as a false positive, and identifying the strongest return of the remaining n−1 return signals as a true positive.

Detecting that the output signal comprises a false return may additionally or alternatively comprise providing one or more LIDAR points to an ML model, the one or more LIDAR points comprising a return associated with the output signal, and receiving an indication from the ML model that the return associated with the output signal (i.e., one of the one or more LIDAR points) is a false return.

For example, the techniques may comprise training the ML model to differentiate between solid body motion and particulate matter and/or fluid motion. In other words, the ML model may detect lidar data that moves like a fluid and identify such points as false positives. In some examples, training the ML model may comprise simulating movement of particulate matter (e.g., dust, water vapor, other gas(ses), rain) in a fluid, such as air. For example, the simulation may comprise simulating movement of the particulate matter in a first fluid (e.g., hot/warm air, air in which water has precipitated/surpassed a saturation point) while the first fluid is surrounded by a second fluid (e.g., cooler air, air without water vapor suspended therein). In some examples, the first fluid may be labeled as being associated with particulate matter and the ML model may be trained, using a supervised training technique, to identify a return associated with particulate matter as being a false return. In at least some such examples, a sequence of returns may be input into such a model (and/or such a model may comprise a "memory," such as in the form of a recurrent neural network, for example using Long-Short Term Memory structures) so that such particle motion may be discerned by the model. In other words, the ML model output may determine feature(s) (e.g., likelihood that sensor data is associated with particulate matter) per point of sensor data.

In an additional or alternate example, the techniques may comprise training the ML model using a semi-supervised technique based at least in part on sensor data. For example, the techniques may comprise receiving a thermal image (e.g., image received from an infrared (IR) camera) and lidar data associated with a same portion of the environment. The techniques may comprise projecting the lidar data into an image space associated with the thermal image and associating thermal data with lidar data that is associated with a same portion of the environment. In some examples, the techniques may comprise collecting and/or labelling lidar data that is associated with a temperature (identified by the thermal image) that meets or exceeds a threshold temperature. This lidar data may be collected as training data. In some examples, additional (e.g., human) supervision may be conducted to label the lidar data as being associated with particulate matter. In an additional or alternate example, the techniques may comprise receiving an image (e.g., a grayscale image, a color image) and determining whether the lidar data associated with a temperature that meets or exceeds a threshold temperature is associated with a portion of the image that is identified as being associated with particulate matter by an output of another ML model, such as an ML model of a perception pipeline. For example, an example of such a labelling process and/or ML model is discussed in U.S. patent application Ser. No. 16/023,985, filed Jun. 29, 2018, the entirety of which is incorporated herein by reference.

The techniques may additionally or alternatively comprise training multiple ML models as binary classifiers, where each ML model is trained to classify sensor data as either particulate matter or a classification different from the other ML models. For example, the techniques may comprise training a first ML model to classify sensor data as particulate matter or a vehicle, a second ML model to classify sensor data as particulate matter or a pedestrian, and so on. In some examples, one or more of the multiple ML models may determine a confidence score associated with the classification and the output may be based at least in part on determining a maximum confidence score across the outputs of the different ML models. In some examples, the ML model(s) discussed herein may receive any amount of sensor data as input to infer the likelihood that one or more points of sensor data are associated with particulate matter.

Of course, though discussed above in the context of multiple machine learning models of binary classifiers, the invention is not meant to be so limiting. Indeed, such models may comprise a single network having multiple output heads (or sub-portions of a network) and/or comprise outputs representative of probability distributions over a set, continuous outputs, multiple classes, or the like.

Once the LIDAR system identifies a false return, the techniques may include suppressing the false return from being identified as a detection. This suppression may be accomplished by preventing the LIDAR system from positively identifying the detection as a true positive detection. Preventing the LIDAR system from identifying the detection as a genuine detection may include increasing a detection threshold by a static amount, increasing the detection threshold detection by an amount determined based at least in part on the output signal of the first channel and/or the second channel, increasing the detection threshold for the portion of the output signal corresponding to the detection, increasing the detection threshold for one or both channels, and/or discarding the output signal. For example, the LIDAR system may be configured to output, as a positive detection, a distance measurement and/or angle associated with portion(s) of an output signal that meet or exceed the detection threshold. In some examples, the LIDAR system may preliminarily identify, as a return, any portion of an output signal that meets or exceeds the detection threshold.

Similarly, a false detection that was not suppressed by the LIDAR system may be suppressed by a downstream component of the perception component based at least in part on determining that a detection is a false detection. In some examples, this may comprise deleting the false detection and/or setting a new value for the false detection. In at least some examples, such measurements may not be suppressed, but otherwise associated with an uncertainty (or certainty/probability) that the return is associated with fog, exhaust, steam, or otherwise. As such, a planner (e.g., of a robotic platform) may discount, or otherwise account for, such points.

The techniques discussed herein may improve the accuracy of LIDAR detections by reducing the number of false positives generated by a LIDAR device and/or the number of false detections appearing in a depth map generated based at least in part on LIDAR data. The techniques discussed herein may accordingly improve the safety and accuracy of operation of systems that rely on detections generated by a LIDAR device.

Example Lidar System

FIG. 1A illustrates a block diagram of components of an example LIDAR system 100 that may comprise one or more channels and suppress false detections (or otherwise provide associated probabilities of being associated with particulate matter returns). The depicted example illustrates an example scenario in which particulate matter 102 may interfere with operation of a channel the LIDAR system 100.

The example LIDAR system 100 in FIG. 1A depicts a single channel, although the example LIDAR system 100 may comprise any number of channels. A channel may be used to emit a laser light pulse and to measure properties of the reflections of the pulse, as explained below, and may comprise at least an emitter-sensor pair, such as, for example, emitter 104 and corresponding sensor 106. One skilled in the art would understand that the light emitters and light sensors may be multiplied in number beyond the single laser emitter and light sensor depicted. For example, a first channel may measure a distance to any detectable surface in a first direction of an environment surrounding the example LIDAR system 100, whereas a second channel may measure a distance to any detectable surface in a second direction, where the first direction and the second direction are separated by three to five degrees, for example. The term "channel" may also encompass supporting circuitry that is associated with the emitter/sensor pair and at least some of the supporting circuitry may be shared among multiple channels (e.g., detector(s), digital-to-analog converter (DAC), analog-to-digital converter (ADC)). In some examples, adjacent channels of example LIDAR system 100 may be disposed within a housing of the example LIDAR system 100 to emit light and/or receive light along different azimuths and/or altitudes. Note, also, that although FIG. 1A depicts a LIDAR system, the techniques discussed herein may additionally or alternatively applied to a time of flight (ToF) system, a RADAR system, etc.

In some examples, emitter 104 may include a laser emitter that produces light of a wavelength between 600 and 1000 nanometers. In additional or alternate examples, the wavelength of emitted light may range between 10 micrometers to 250 nm. The emitter 104 may emit light (e.g., laser pulses) that varies in power and/or wavelength. For example, some of the laser emitters of the example LIDAR system 100 may emit light at a 905 nanometers, and others of the laser emitters may emit light at 1064 nanometers. The laser emitters of the different wavelengths can then be used alternately, so that the emitted light alternates between 905 nanometers and 1064 nanometers. The sensor 106 may be similarly configured to be sensitive to the respective wavelengths and to filter other wavelengths.

Activating or turning on an emitter may be referred to as "firing" the emitter. In some examples, the emitter 104 may be fired to create a light pulse having a short duration. Moreover, to conserve power, the example LIDAR system 100 may decrease the power of the emitted light pulse based, at least in part, on detected conditions of the environment into which the light pulse is to be emitted (e.g., low light/low noise conditions). In some examples, the emitter 104 may be driven to output a pseudorandom noise (PN) sequence and/or other code. For example, each emitter of the LIDAR system 100 may output a difference PN sequence to differentiate between returns.

For a single distance measurement via the depicted channel, emitter 104 may be controlled to emit a burst of light pulses 108 (i.e., one or more) through a lens 110 as emitted pulse 112 and the corresponding sensor 106 may be powered on and/or otherwise allowed to pass a signal generated by the sensor 106 to detector 114. In some examples, the detector 114 may read a signal generated by the sensor 106 by opening a switch corresponding to the sensor 106. A sensor is considered "active," according to the discussion herein, when the signal output by a sensor is being read by the detector 114 and/or otherwise being relied on to determine whether or not the output signal indicates the existence of a surface.

In the example scenario, the emitted pulse 112 may be partially or completely reflected by particulate matter 102 as reflection 116 (also referred to herein as reflected light). For example, particulate matter 102 may comprise water particles and/or droplets, dust particles, vehicle emissions, smoke particles, etc. In some examples, the particulate matter 102 may refract the emitted pulse 112, thereby causing the reflection 116 to comprise a split beam of light 142. The particulate matter 102 may also cause multiple reflections of respective portions of the emitted pulse 112. Collectively, these multiple reflections and/or refractions may cause the power of output signal 122 to be smeared over time. In some cases, part of the emitted pulse 112 may, in some cases and depending on the density and/or type of the particulate matter 102, pass through the particulate matter 102, and be reflected by a surface 118 behind the particulate matter 102 along an azimuth associated with the channel, which is depicted in FIG. 1A as reflection 144. In some examples, all or part of reflection 144 may pass through the particulate matter 102 on a return path and be received at sensor 106. FIG. 1A depicts possible reflections and/or refractions 146 of this reflection 144 that may be caused by particulate matter 102.

The reflection 116 may pass through a lens 120 to sensor 106.

In some examples, the lens 110 and the lens 120 may be the same lens, depicted redundantly for clarity. In some examples, the LIDAR may include multiple laser emitters positioned within a chassis to project laser light outward through the one or more lenses. In some examples, the LIDAR may also include multiple light sensors so that light from any particular emitter is reflected through the one or more lenses to a corresponding light sensor. In other examples, the lens 120 may be a second lens designed so that beams from different emitters at different physical positions within a housing of the LIDAR are directed outwardly at different angles. Specifically, the lens 110 may be designed to direct light from the emitter of a particular channel (e.g., emitter 104) in a corresponding and unique direction. The lens 120 may be designed so that the corresponding sensor (e.g., sensor 106) of the channel receives reflected light from the same unique direction to disambiguate between light received through the lens 120 that is attributable to reflections of light emitted by other emitter(s).

In some examples, the sensor 106 may comprise a photomultiplier (e.g., silicon photomultiplier (SiPM)), photodiode (e.g., avalanche photodiode (APD), single-photon avalanche diode (SPAD)), and/or other device that converts light intensity at the sensor to a corresponding electrical signal (output signal 122). A portion of the output signal 122 generated by the sensor 106 may be attributable to the reflection 116. This portion of the output signal 122 may be termed a "return" and/or "return signal." Where the output signal 122 comprises a portion attributable to a reflection off the surface 118 and the particulate matter 102, the output signal would be said to comprise two returns (e.g., two portions of the output signal that have an amplitude and/or power that meet or exceed a detection threshold).

A return signal attributable to reflection off a surface 118 (without any interference from particulate matter 102) may generally be of the same shape as the light pulse 108 emitted by the emitter 104, although it may differ to some extent as a result of noise, interference, cross-talk between different emitter/sensor pairs, reflectivity of the surface 118 (e.g., whether the surface is L'Ambertian, retroreflective, etc.), an angle of the surface 118, interfering signals from other LIDAR devices, and so forth. The return signal will also be delayed with respect to the light pulse 108 by an amount corresponding to the round-trip propagation time of the emitted laser burst (i.e., the time delay of arrival). However, the return signal attributable to reflection of particulate matter 102 may not share the shape of light pulse 108.

In some examples, the detector 114 may read the output signal(s) generated by the sensor(s) of any currently active channels to determine whether any of the output signal(s) include a return signal (e.g., output signal 122 of sensor 106). For example, the detector 114 may determine whether an amplitude, energy, trigger event count (e.g., every instance an avalanche is triggered at a SPAD), and/or any other indication of a reception of a reflection of light emitted by an emitter of a channel, satisfies a detection threshold (e.g., meets or exceeds a detection threshold in amps, in Joules, arbitrary number (e.g., a number of counts, or units, as output from an ADC), etc.). For example, if the sensor 106 is active, the detector 114 may monitor the output signal 122 of the sensor 106 to determine whether an amplitude of the output signal 122 meets or exceeds the detection threshold. If a portion of the output signal 122 meets or exceeds the detection threshold, the detector 114 may indicate that portion as being a return signal and/or may output a detection 124. For example, the detector 114 may determine a time delay of arrival between emission of the light pulse 108 and receiving the reflected light pulse at the sensor 106 (i.e., as indicated by a relative time of the return signal) and/or a distance measurement corresponding to the time delay of arrival. In some examples, the detection 124 may comprise a distance measurement and/or a spatial position (e.g., a position within a depth map and/or voxel representation).

The detector 114 may be implemented in part by a field-programmable gate array ("FPGA"), an application-specific integrated circuit (ASIC), a microcontroller, a microprocessor, a digital signal processor ("DSP"), and/or a combination of one or more of these and/or other control and processing elements, and may have associated memory for storing associated programs and data.

Without implementing the techniques discussed herein, the detection 124 may be a false detection (i.e., a false positive indication of the existence and/or position of a surface in an environment surrounding the example LIDAR system 100) if the detection 124 indicates a position of the particulate matter 102. The techniques discussed herein may comprise techniques for identifying false returns and suppressing false detections at the detector 114 and/or techniques for identifying and suppressing false detections at a component downstream from the detector 114 such as, for example, a device that receives output from the example LIDAR system 100 (e.g., a computing device of an autonomous vehicle and/or a component thereof such as, for example, a perception component). In at least some examples, a detection 124 may not be suppressed, but otherwise associated with an uncertainty (or certainty/probability) that the return is associated with fog, exhaust, steam, or otherwise. As such, a planner (e.g., of a robotic platform) may discount, or otherwise account for, such detections.

Example Scenario

Figure 1B:
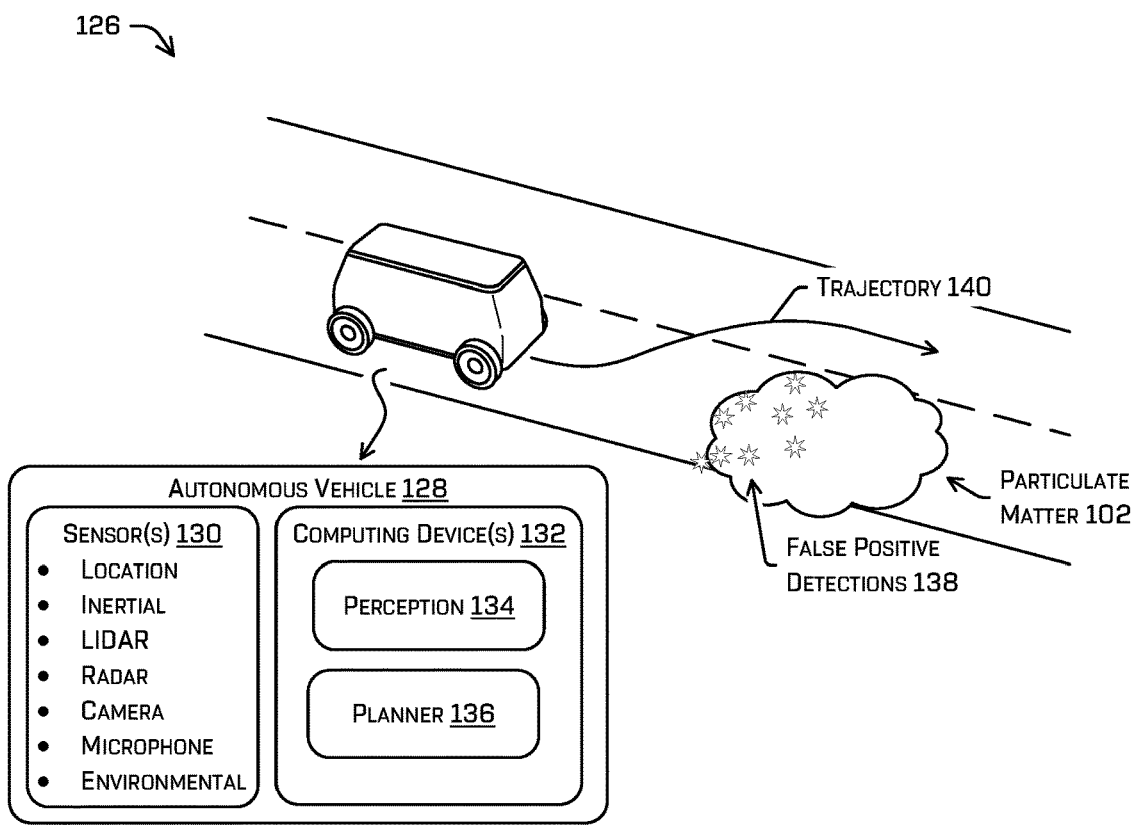
FIG. 1B illustrates an example scenario depicting an autonomous vehicle coming upon a particulate matter and the potential effect caused by false detections.

FIG. 1B illustrates an example scenario 126 in which false detections may deleteriously affect the operation of a machine that relies on the accuracy of LIDAR detections, such as an autonomous vehicle 128. In some instances, the autonomous vehicle 128 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 128 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to mapping, manufacturing, augmented reality, etc.

According to the techniques discussed herein, the autonomous vehicle 128 may receive sensor data from sensor(s) 130 of the autonomous vehicle 128. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc.

In some examples, the autonomous vehicle may include computing device(s) 132 that may include a perception component 134 and/or a planner 136. The perception component 134 may include one or more machine-learned (ML) models and/or other computer-executable instructions for detecting, identifying, segmenting, classifying, and/or tracking objects based at least in part on sensor data collected from the environment of the autonomous vehicle 128. In some instances, the perception component 134 may receive sensor data from sensor(s) 130 of the autonomous vehicle 128, determine perception data from the sensor data, and transmit the perception data to a planner 136 for use by the planner 136 to localize a position of the autonomous vehicle 128 on a global map and/or a local map, determine one or more trajectories, and/or control motion of the autonomous vehicle 128 to traverse a path or route, though any such operation may be performed in various other components (e.g., localization may be performed by a localization engine, not shown). In some instances, the perception data may be based at least in part on LIDAR data received from a LIDAR device of the sensor(s) 130. The planner 136 may determine instructions for controlling operations of the autonomous vehicle 128 based at least in part on perception data that is based on LIDAR data received from the LIDAR device.

In particular, the planner 136 may rely on one or more LIDAR device(s) of the sensor(s) 130 to determine the existence and/or position(s) of object(s) in order to safely and efficiently control operation of the autonomous vehicle 128. False positive detections of the existence of a surface by a LIDAR device may degrade operation of a machine that relies on LIDAR data, like autonomous vehicle 128. For example, FIG. 1B illustrates an example two-dimensional representation of false positive detections 138 (e.g., false positive LIDAR data) attributable to particulate matter 102 that autonomous vehicle 128 is able to pass through without harm to the autonomous vehicle 128 or its occupants.

In some examples, a LIDAR detection may comprise an indication of a distance to a detected surface calculated based at least in part on a time of delay of arrival of a reflection of light emitted by an emitted of the LIDAR device, as discussed above. In some examples, a processor of the LIDAR device and/or the perception component 134 may determine a position of the surface relative to an axis of the LIDAR device and/or the autonomous vehicle 128 based at least in part on a known position and/or orientation of the LIDAR device and/or the channel (e.g., altitude and/or azimuth).

Since the false positive detections 138 falsely identify a surface where none exists, the planner 136 may alter a trajectory 140 of the autonomous vehicle to avoid colliding with the false surface and/or may take other undesirable actions, such as stopping forward progress, transmitting a request for teleoperations assistance, etc.

Example Output Signals—Techniques for Screening False Returns

FIGS. 2A-3B illustrate example signal diagrams of output signals received from a sensor of a channel responsive to various reflections. The example signal diagrams depict an amplitude of each output signal (y-axis) over time (x-axis). Although the signal diagrams depict a magnitude of the output signals as an amplitude, it is contemplated that the output of a sensor of a channel may depend on the type of sensor used. For example, if the LIDAR system utilizes a sensor that comprises a SPAD, the output of the SPAD (and/or its associated circuitry) may actually be a pulse output and/or count (since the SPAD operates in Geiger mode), whereas other APDs may output a voltage that reflects the intensity of light incident on the sensor (as in the case of SiPMs and/or more traditional APDs). Regardless of the particular type(s) of sensors used, for the sake of simplicity FIGS. 2A-3B and the corresponding description discuss the intensity of a signal as an amplitude, although it is understood that intensity may be measured in a variety of ways, depending on the sensor type and/or use (e.g., counts per nanosecond, voltage, current, power). Similarly, since the output signal may vary depending on the type of sensor used, the detection threshold discussed herein may have units that correspond with the sensor type used. For example, the detection threshold may be an indication of voltage, current, power, count rate, any combination thereof, etc.

Moreover, in some examples, although the depicted output signals have an appearance that looks like an analog signal, it is understood that intermediate electronics between the sensor and the detector may (or may not) comprise a DAC. In other words, the output signal may be sampled, amplified, and/or discretized in a manner that is not reflected in the figures and is not of consequence for this discussion, other than to note that the output signals may be digital signals and the detector may comprise a processor of some kind and/or, inversely, that the output signals may be analog signals and the detector may comprise an analog circuit.

The example signal diagrams illustrated in FIGS. 2A-3B may represent the output signal generated by a sensor of a channel for the duration of time for which that sensor was active/being read by a detector. In some examples, this duration of time may be 1 microsecond, although it is understood that the duration may depend on the effective range of the LIDAR and/or the desired range of measurement. The depicted output signals are examples of signals that were generated contemporaneously.

FIG. 2A illustrates an example of an output signal 200 generated by sensor 106 based at least in part on light reflected to the sensor 106 by a surface, such as surface 118, and therefore includes a (true positive) return 202.

In some examples, detector 114 may identify a portion of an output signal that meets or exceeds a detection threshold 204 as a return. In some examples, the detection threshold 204 may be a variable stored and/or controlled by detector 114 and/or a downstream device such as, for example, a perception component. The detection threshold 204 may preliminarily be set to avoid identifying noise as a detection. U.S. Provisional Application No. 62/800,386, filed Feb. 1, 2019, the entirety of which is incorporated by reference, discusses the detection threshold and/or other elements in additional detail. In the illustrated example, the detection threshold 204 corresponds to an amplitude value. FIGS. 2B-3B also illustrate the detection threshold 204 that is the same in the depicted example, although in additional or alternate examples, the detection threshold 204 may be a different value for different channels and/or different scans of the LIDAR sensor, as discussed further herein.

Notably, return 202 has a duration 206 (or width) and/or other characteristics that may correspond with a light pulse emitted by emitter 104. For example, the return 202 may have a shape that corresponds to light pulse 108. In some examples, the detector 114 may calculate a cross-correlation of the return 202 with an expected return signal and/or the emitted light pulse to determine a similarity of the return 202 to the expected return signal and/or the emitted light pulse. The expected return may be an artificially constructed signal shape and/or may be based on properties of one or more true positive returns of a set of training data. For example, detector 114 may calculate a similarity of the return 202 to the expected return signal and/or the emitted light pulse based at least in part on a cross-correlation and, if the similarity meets or exceeds a similarity threshold, the detector 114 may indicate that the return 202 is a true return, or, if the similarity does not meet the similarity threshold, the detector 114 may indicate that the return 202 is a false return. The detection may comprise a depth measurement calculated by the detector 114 based at least in part on a time of flight between a time at which the light pulse was emitted by the emitter 104 and a time, ti, at which the return 202 was received by the sensor 106.

The detector 114 may indicate that a depth measurement associated with a return is a true positive by outputting a detection and/or by outputting a detection that indicates that the depth measurement is a true positive. The detector 114 may indicate that a depth measurement associated with a return is a false positive by suppressing output of a detection and/or by outputting a detection that indicates that the depth measurement is a false positive. Including an indication that a detection is a false detection or a true detection, according to the detector 114, may provide extra information to a downstream component to may conduct further false positive screening. In some examples, although detector 114 may output an indication of a true detection a downstream component, such as a perception component, may determine that the detection is a false detection, according to techniques discussed below.

FIG. 2B illustrates an example of an output signal 208 generated by sensor 106 based at least in part on light reflected to the sensor 106 by particulate matter 102. In some examples, the detector 114 may identify the portion of output signal 208 that meets or exceeds the detection threshold 204 as a return 210. However, since the return 210 is attributable to particulate matter 102 and not a surface, return 210 is a false positive return. In some examples, the detector 114 may provide the return 210 to a correlator, which may return a similarity score based at least in part on an expected return signal and/or the emitted light pulse. For example, the correlator may convolve and/or cross-correlate the return 210 and the expected return signal and/or the emitted pulse signal, and determine a maximum convolution and/or cross-correlation value. The similarity score may comprise a maximum convolution value and/or a maximum cross-correlation value (and/or a normalization thereof). If the similarity score does not satisfy a similarity threshold (e.g., meets or exceeds a similarity threshold), the detector 114 may generate a detection that indicates that the return 210 is a false return.

Energy associated with return 210 is distributed over a duration 312 of time that is greater than duration 206. This may be attributable to the diffusive properties of the particulate matter 102 and/or since the size of the emitted light beam may be larger than the particle, so a singular beam may be partially reflected by hundreds or thousands of particles at different distances. Whereas, duration 206 may more closely correspond to a duration of time for which light was emitted by emitter 104.

In some examples, detecting return 210 as being a false return may comprise determining that duration 312 meets or exceeds a threshold duration. The threshold duration may be based on the firing duration of the emitter 104. For example, the threshold duration may be the firing duration plus a duration of time to account for noise and/or the reflectivity of different materials.

In some examples, the detector 114 may determine whether the return 210 comprises multiple local maxima. If the return 210 comprises multiple local maxima, the detector 114 may identify the return 210 as a false return. In some examples, the detector 114 may identify, as a false return, a portion of the output signal that comprises a local maximum that is less than a previous (in time) local maximum and/or that is associated with a duration (width) that meets or exceeds a threshold duration (width). In an additional or alternate example, the detector 114 may identify, as a true return, a portion of the output signal that comprises a local maximum that is greater than a previous (in time) local maximum and/or that is a last-in-time local maximum and/or that is associated with a threshold duration (width) that does not meet the threshold duration (width).

FIGS. 3A and 3B illustrate example signal diagrams that may be generated by a sensor based at least in part on a second light emission corresponding to a same or similar region of the environment as measured by a first light emission corresponding to the output signal 208 of FIG. 2B. The techniques discussed herein may comprise detecting one or more returns as being false returns based at least in part on varying power and/or frequency of light emitted by emitter 104 in a first scan versus a second scan and/or operating two LIDAR channels and/or LIDAR sensors at different powers and/or frequencies.

For example, varying the power and/or frequency may comprise operating a first LIDAR channel and/or first LIDAR system at a first power and/or first frequency and a second LIDAR channel and/or second LIDAR system at a second power and/or second frequency. Additionally or alternatively, the LIDAR system may operate a first channel at a first power and/or frequency and may alter the power and/or frequency of a second channel that will scan a same or similar region of the environment as the first channel. The LIDAR system may determine that the second channel will scan a same or similar region based at least in part on IMU data and/or a relative orientation, position, and/or rotation (and changes thereto over time) of the first channel and/or the second channel.

The detector 114 may receive a first output signal received according to operation at a first power and/or a first frequency and a second output signal received according to operation at a second power and/or a second frequency (whether from a same channel, different channel, and/or different LIDAR system). FIG. 2B depicts an example of a first output signal and FIGS. 3A and 3B depict examples of a second output signal.

FIG. 3A illustrates an example of an output signal 314 generated based at least in part on higher-powered and/or frequency-altered light reflected to the sensor (a second output signal). In some cases, the increased power increases the number of photons emitted by an emitter and therefore increases the chance that at least some of these photons reflects off of a surface behind the particulate matter and back again to the sensor. FIG. 3A depicts such an example. The output signal 314 comprises two returns, a (false) return 316 attributable to particulate matter 102, and a (true) return 318 attributable to light that penetrated the particulate matter 102 and reflected off a surface.

In some examples, the detector 114 may alter an operation state of the detector 114 to a "last-received" state based at least in part on receiving an indication of a false return and/or false detection according to any of the techniques discussed herein. In the "last received" state, the detector 114 may ignore any returns that are not associated with a return that was last-in-time (i.e., return 316 in the depicted example). In an additional or alternate example, the detector 114 may alter an operation state of the detector 114 to a "top n returns" state, outputting a top-n returns that exceed the detection threshold according to a strength (e.g., power, energy, maximum amplitude) of the returns, where n is a positive integer (e.g., 2, 3, 4, 5, and so on). For example, a return may be a peak and/or other portion of an analog signal that meets or exceeds a detection threshold and/or a digital signal that meets or exceeds a detection threshold. In some instances, there may be multiple such portions of a signal that meet or exceed a threshold. In an additional or alternate example, the detector 114 may determine the top n returns based at least in part on a strength of the returns and/or a similarity of the returns to a transmit signal (e.g., a cross-correlation, convolution, autocovariance, autocorrelation, and/or the like of a return to the transmit signal).

In some examples, the detector 114 may comprise multiple channels and may operate the channels in the same or different states. For example, a first set of channels of the detector 114 may output the first-in-time return, whereas a second set of channels of the detector 114 may output the last-in-time return. The detector 114, additionally or alternatively output the transmit power associated with a channel, the pulse width associated with a return detected by the channel, the power of the return detected by the channel, and/or any other characteristic associated therewith. In some examples, a channel may output multiple returns, such as both a first-in-time return and a last-in-time return, although other combinations are possible. For example, the detector 114 may be configured according to the techniques discussed herein to identify a false return and ignore or discard that return instead of outputting the false return. In some examples, the detector 114 may control which channels operate according to the different return output schemes discussed herein (e.g. output first-in-time, output last-in-time, output non-false return as determined according to the techniques discussed herein).

In some examples, the detector 114 may screen any returns (the last return and/or any of the returns) according to any of the techniques discussed herein. For example, the detector 114 may provide the return 316 and/or return 318 to a correlator, which may generate similarity score(s), by which the detector 114 may identify return 316 as a false positive and return 318 as a true positive.

FIG. 3B illustrates an example of an output signal 320 generated based at least in part on higher-powered and/or frequency-altered light reflected to the sensor (a second output signal). Unlike FIG. 3A, FIG. 3B illustrates an example where the increase in power and/or alteration in the frequency was insufficient to penetrate the particulate matter and/or no surface lies within range behind the particulate matter. The detector 114 may compare the return 222 of the output signal 320 (the second output signal) to a return of an output signal produced for a same location in the environment produced based at least in part on a reflection of a light emission having a different power and/or frequency (e.g., output signal 208, output signal 200). The detector 114 may determine a delta between characteristics of return 222 to a return of the first output signal (e.g., output signal 208). The detector 114 may identify the return 222 as a false return based at least in part on determining that the delta meets or exceeds a change threshold.

For example, the detector 114 may compare a duration 224 (width) of the return 222 to duration 312, the detector may determine a difference between first spectral data (Fourier, frequency domain, FFT, Short Time Fourier, Laplace, Wavelet, etc.) associated return 210 (and/or output signal 208) and second spectral data associated with return 222 (and/or output signal 320), and/or the detector 114 may determine a cross-correlation between return 210 (and/or output signal 208) and return 222 (and/or output signal 320). Changes between characteristics of the returns and/or output signals may be indicative of a false return, since return signals attributable to a reflection off a surface are unlikely to vary, whereas particulate matter such as fog or smoke may cause high variations because of the mutable densities of particulate matter within a region.

In an additional or alternate example, the detector 114 may determine a reflectivity based at least in part on a return signal. If the reflectivity is less than a reflectivity threshold, the detector 114 may identify the return as a false return. For example, the detector 114 may calculate the reflectivity based at least in part on power of the emitted light, the estimated distance measurement calculated for the return, and the received power. In some examples, the reflectivity threshold may be less than a reflectivity of black surfaces so that black surfaces are not detected as false positive surfaces, when they should be detected as true positive surfaces.

In some examples, the techniques may comprise determining whether a false return 210 is associated with particulate matter or another interference, such as a retroreflector. For example, the techniques may comprise comparing a transmitted signal to a return, such as by determining a cross-correlation of a return representative of a particulate matter return and/or a return representative of a retroreflector return to the return 210, either of which being a heuristic return. In some examples, the techniques may comprise determining a set of such heuristic returns (e.g., associated with particulate matter, associated with a retroreflector, associated with rain), each heuristic return of which may be associated with a different transmit power. In an additional or alternate example, the techniques may comprise determining another type of relationship between a transmit signal and a received false return (e.g., a table associating a transmit power/amplitude with a duration of a return, a table associating a transmit power/amplitude with an attenuation of the return) for a respective type of interference (e.g., particulate matter, retroreflector, other).

For example, a false return associated with particulate may attenuate more slowly than a false return associated with a retroreflector, but, in some instances, this may depend on transmit power/amplitude and/or other transmitted signal characteristics. In some examples, an ML model may be trained to classify a return signal as being a false positive and/or a type of interference associated with a false positive.

Techniques for Screening False Detections

FIGS. 4A-5B depict representations of techniques for screening false detections. For example, a detector may provide a detection to a downstream component, such as a perception component, which may amalgamate one or more detections and/or conduct further screening for false detections. In some examples, the perception component may transmit an indication of a false detection upstream to the detector and/or may modify operation of the detector and/or a LIDAR system based at least in part on detecting one or more false detections that were un-detected by the detector.

For example, the perception component may cause instructions to be transmitted to a LIDAR system to switch the detector into "last return" mode, or to instruct one or more LIDAR systems to operate at an altered power and/or frequency. In an additional or alternate example, the LIDAR system and/or the perception component may target an area of interest (e.g., an area where one or more returns or detections may be associated with particulate matter) by increasing a resolution of a scan of the area of interest. For example, a LIDAR system may scan a location five times within a scanning time frame and at least one of the times, the LIDAR system may have indicated that a point associated with the location may be associated with particulate matter. The LIDAR system and/or the perception component may increase a resolution of the scans done at and/or around the location based at least in part on an indication that the point may be associated with particulate matter.

In some examples, the perception component may receive one or more indicators associated with the veracity of a detection and may determine whether to identify a detection as a false positive or a true positive based at least in part on output of a machine-learned model and/or determining, based at least in part on values representing the indications, a confidence score that one or more detections are false positives. For example, the indicators may comprise information determined by the detector discussed above (e.g., a depth measurement, an indication that a return is a false positive, an indication that a return is a true positive, a similarity score, a delta value), and/or one or more of the indications discussed below regarding FIGS. 4A-5B. The perception component may determine a confidence score associated with a single detection and/or one or more detections. If the confidence score meets or exceeds a confidence threshold, the perception component may suppress a detection as a false detection.

Figure 4A:
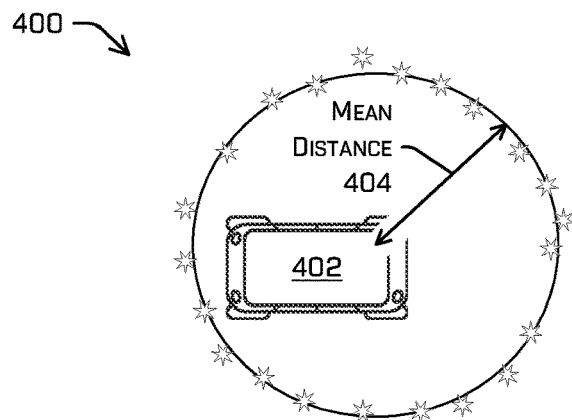
FIGS. 4A-4C illustrate diagrams of example techniques for detecting false detections, based at least in part on distribution(s) of LIDAR detections and/or their associated depth measurements and/or variance(s) associated therewith.

FIG. 4A depicts an example scenario 400 in which an autonomous vehicle 402 is operating in an environment that includes total or near-total particulate matter permeation, as may be the case in fog or smoke from a distant forest fire. The perception component may determine an indication that one or more detections are likely to be false detections based at least in part on determining a mean distance 404 and determining that a statistically significant percentage of the detections lie within a distance of the mean distance 404. Such a mean distance may be, for example, associated with a penetration depth of a LIDAR into a field of particulate matter based on a given input frequency and emission power. In those cases in which the sensor is passing through particulate matter, it is assumed that all such returns should be, in general, normally distributed. In such examples, comparing a single measurement to an average of measurements may, therefore, be indicative of a false return. For example, the perception component may generate an indication that the autonomous vehicle 402 is likely surrounded by particulate matter (e.g., which may be indicated by a score that meets or exceeds a threshold, e.g., a similarity score of all returns) based at least in part on determining that 80% or more of the detections lie within half of a standard deviation from the mean distance 404.

Figure 4B:
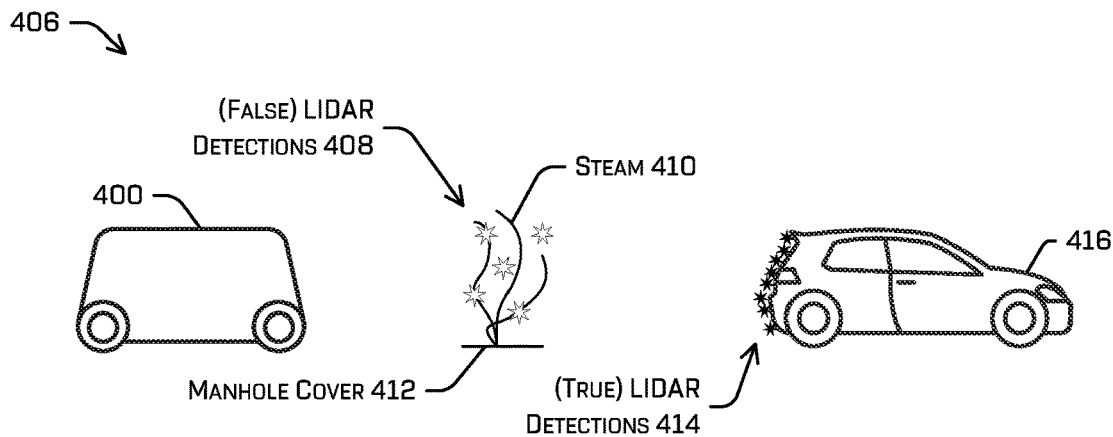

FIGS. 4B and 4B depict techniques for screening detections for false positives based at least in part on determining a variance between distance measurements within a scanned area.

FIG. 4B depicts an example scenario 406 in which a LIDAR sensor has generated a set of (false) LIDAR detections 408 associated with steam 410 rising from a manhole cover 412 and a (true) LIDAR detections 414 associated with a vehicle 416. Note that steam 410 is an example of "local" particulate matter since the false detections are isolated to a sub-portion of the region observable by a LIDAR sensor.

Figure 4C:
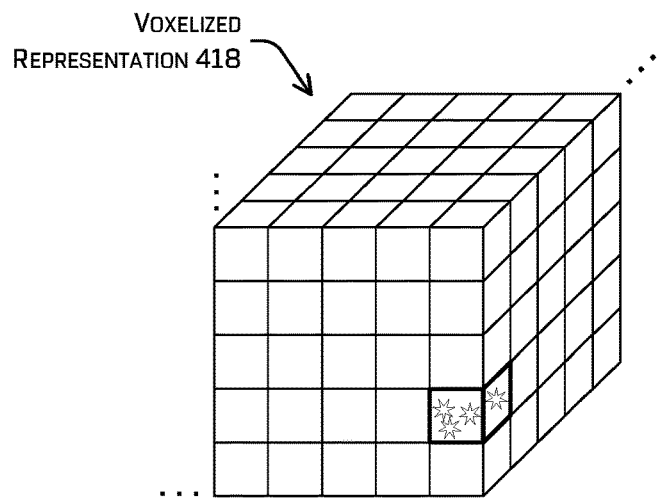

The techniques may additionally or alternatively comprise determining a variance associated with a region scanned by the LIDAR sensor. For example, the perception component may generate a depth map based at least in part on detections received from the detector. FIG. 4C depicts a voxelized representation 418 of a depth map where a voxel may correspond to a unit of space in the environment surrounding the LIDAR sensor (e.g., a cubic meter, a cubic foot, a cubic centimeter) and may comprise multiple LIDAR points. For example, one voxel of the voxelized representation 418 is emphasized with heavy lines, and contains a number of LIDAR points.

The perception component may determine a variance, based at least in part on LIDAR points associated with a voxel. If a variance associated with a voxel meets or exceeds a variance threshold, the perception component may generate an indication that the subset of LIDAR points associated therewith are likely false detections. For example, LIDAR points associated with a surface, such as the back of vehicle 416, may exhibit a low variance since surfaces tend to be smooth, whereas LIDAR points associated with particulate matter may tend to exhibit a higher variance in the distance measurements indicated by the LIDAR points, due to the mutable density of particulate matter. In some examples, the variance threshold may monotonically increase with increased distance (i.e., the variance threshold may increase as the distance indicated by LIDAR points of a sub-set increase). This may prevent small objects that vary in depth within a small region, such as small leaves on a bush, and that lie distant from the LIDAR sensor as being identified as particulate matter.

In some examples, the perception component may additionally or alternatively project LIDAR points from a three (or more) dimensions two-dimensions, such as an image space. The perception component may then determine a variance for LIDAR points associated with projected LIDAR points in an area of the two dimensions. The perception component may additionally or alternatively determine whether a detection is a false detection based at least in part on receiving an image, an image segmentation, a semantic segmentation, and/or a region of interest associated with the image and/or correlating a projected LIDAR point with one or more of an image segmentation, a semantic segmentation, and/or a region of interest, as described in U.S. patent application Ser. No. 16/023,878, filed Jun. 29, 2018.

In some examples, the perception component may additionally or alternatively receive an image (such as a thermal image), and determine a region of the thermal image associate with a temperature that meets or exceeds a threshold temperature. In some examples, the threshold temperature may be set heuristically and/or may be determined based at least in part on sensor data. For example, the techniques may comprise determining the threshold temperature based at least in part on sensor data, such as by determining an average ambient temperature and/or a distribution of detected temperature(s) (e.g. using a thermometer and/or based at least in part on temperatures indicated by a thermal image). In such an example, the techniques may comprise setting the threshold temperature to be one or two standard deviations above the average temperature and/or by adding a scalar value to the average temperature that is based at least in part on a difference between the average temperature and a dew point.

In some examples, the techniques may comprise indicating that LIDAR points associated with a region of a thermal image that meets or exceeds a threshold temperature are false positives, collecting the LIDAR points as training data for an ML model, and/or providing the LIDAR points as input the ML model. In some examples, the ML model may be trained to classify a LIDAR point of the LIDAR points as a true positive or a false positive. In some examples, one or more frames of LIDAR points may be collected and/or provided to the ML model as input, where a first frame of LIDAR points are LIDAR points collected at a first time and a second frame of LIDAR points are LIDAR points collected at a second time after the first time.

In some examples, the perception component may identify one or more detections as false detections based at least in part on filtering a sub-set of LIDAR points (e.g., those associated with a voxel and/or some other region) based at least in part on a high-pass filter, calculating an absolute value of the remaining values, and filtering the absolute values based at least in part on a low-pass filter. The perception component may identify, as regions having high variance, resultant values having a variance above a variance threshold.

In some examples, the perception component may compare a first variance associated with first LIDAR point(s) output by a first LIDAR channel and/or second LIDAR sensor in association with a region to a second variance associated with second LIDAR point(s) output by a second LIDAR channel and/or second LIDAR sensor in association with the region to determine whether the second variance corroborates a likelihood that a detection is a false detection (e.g., the difference between the first variance and the second variance is less than a difference threshold).

In some examples, the perception component may identify a detection as being a false detection based at least in part on determining a change and/or rate of change between two or more detections associated with a same or similar region meets or exceeds a change threshold. Particulate matter may change in density and/or position rapidly, so the position in a same channel (or at least a same or similar position) over successive scans may indicate a high rate of change. The perception component may also track LIDAR data associated with particulate matter. A track associated with the LIDAR data may be used to infer that subsequently received LIDAR data points are likely to also be associated with particulate matter. In some examples, the perception component may calculate an expected flow, according to fluid dynamic principals, and compare the expected flow to an observed flow of LIDAR points over time. The perception component may calculate deviation of the observed flow of LIDAR points to expected fluid behavior and increase or decrease a likelihood that one or more LIDAR points are associated with particulate matter based at least in part on the observed flow exhibiting fluid-like characteristics, or not, respectively. In some examples, the techniques may comprise training an ML model to classify movement as movement of a fluid or movement of a solid. In some examples, such an ML model may receive LIDAR points as input (which may comprise a single scan and/or multiple scans) and may classify a LIDAR point as fluid or a solid. Training the ML model may comprise simulating motion of a fluid, such movement of particulate water vapor in the air, and training the ML model based at least in part on the simulation and/or training data collected by identifying steam (e.g., using computer vision and/or a thermal image).

Moreover, the perception component may additionally or alternatively use contextual data to increase or decrease a confidence (or inversely an uncertainty) that a LIDAR point is associated with particular matter. Contextual data may comprise global map data (e.g., a location of a driving surface, a location of a pedestrian surface) and/or local data determined by the perception component from sensor data. For example, the local data may comprise a classification of a subset of sensor data and/or an identification of the sensor data as being associated with the classification. Tying this all together, this means that the perception component may increase a likelihood that a LIDAR point is associated with particular matter when contextual data indicates that the LIDAR point is located in the middle of a driving surface (a bush would be unlikely to be in the middle of a driving surface) and/or the contextual data indicates a portion of sensor data that attributable to vehicle exhaust.

Figure 5A:
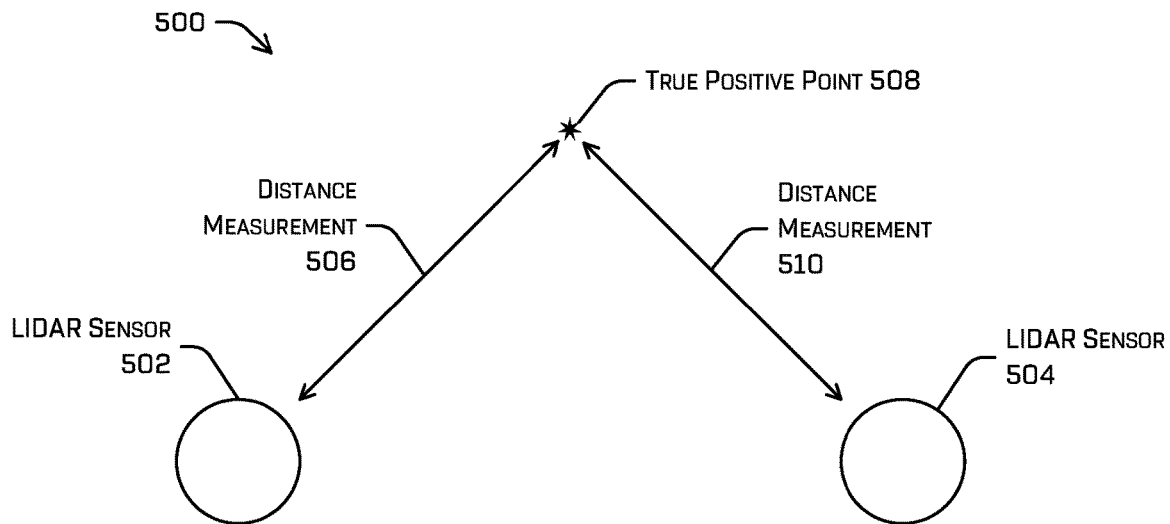
FIGS. 5A and 5B illustrate a diagram of example techniques for identifying a false detection and/or corroborating a determination that a detection is a false detection.

FIG. 5A depicts an example scenario 500 in which no particulate matter interferes with operation of two LIDAR sensors, LIDAR sensor 502 and LIDAR sensor 504. In such a scenario, the perception component may determine that the LIDAR sensor 502 generated a detection associated with a detection and/or distance measurement 506 that is associated with a point (i.e., true positive point 508) that is within a threshold distance of a point associated with a detection and/or distance measurement 510 generated by LIDAR sensor 504. If both LIDAR sensors are associated with points that lie within a threshold distance of each other, this may corroborate that the point is a true positive.

Figure 5B:
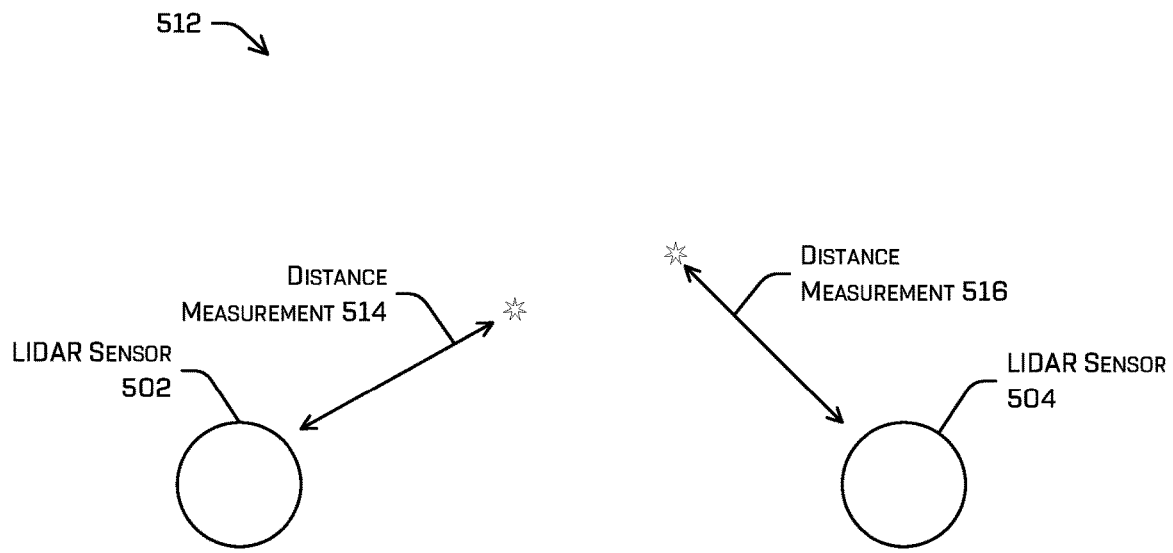

FIG. 5B depicts an example scenario 512 in which particulate matter interferes with operation of at least one of the two LIDAR sensors. For example, the perception component may determine a channels of the LIDAR sensors 502 and 504 that ought to indicate a same point, under normative conditions, based at least in part on directions the channels were pointing into the environment at a specified time. In some examples, particulate matter may prevent one or both LIDAR sensors from determining an accurate depth measurement, which perception component may detect by comparing the position of a point indicated by detection and/or depth measurement 514 associated with LIDAR sensor 502 and/or detection and/or depth measurement 516 associated with LIDAR sensor 504. If a distance between the positions meets or exceeds a threshold distance, the perception component may indicate that one or both of the detections associated therewith are false detections. Determination of the location of the point or direction for comparison may be based, at least in part, on determining extrinsics of the sensors and/or determining an emission angle/vector associated with each, and determining whether the two or more rays (one from each LIDAR) would intersect.

In some examples, the perception component may rely on additional indications to determine whether to indicate one or both detections as false detections. For example, if the perception component also determined that a statistically significant number of detections are within a threshold distance of a mean distance 404, thereby indicating a greater likelihood that the LIDAR sensor is surrounded by particulate matter (as opposed to identifying local particulate matter), the perception component may indicate both detections as false detections. Additionally or alternatively, the perception component may determine whether to indicate one or both of the detections as false detections based at least in part on a variance associated with one and/or both detections. Any other of the indications and analyses discussed herein may additionally or alternatively be included in this determination.

In an additional or alternate example, the perception component may rely on additional or alternate sensor data such as, for example, image data, RADAR data, ToF data, IMU data, etc. In some examples, the perception component may determine a correlation between vehicle speed and distance measurements over time. For example, a true positive surface that isn't moving at a same velocity and direction as vehicle should get closer or further from the autonomous vehicle as the vehicle moves towards/away from the surface. In some examples, the perception component may calculate a spectral representation of the depth measurements over time (e.g., a Fourier transform, FFT, Laplace transform, Wavelet transform, Stockwell transform) and/or a mean rate of change of the distance to the alleged surfaces. Particulate matter may be associated with a greater number of frequencies and derivative of the rate of change over time may remain low when particulate matter surrounds the LIDAR sensor.

Example System Architecture

Figure 6:
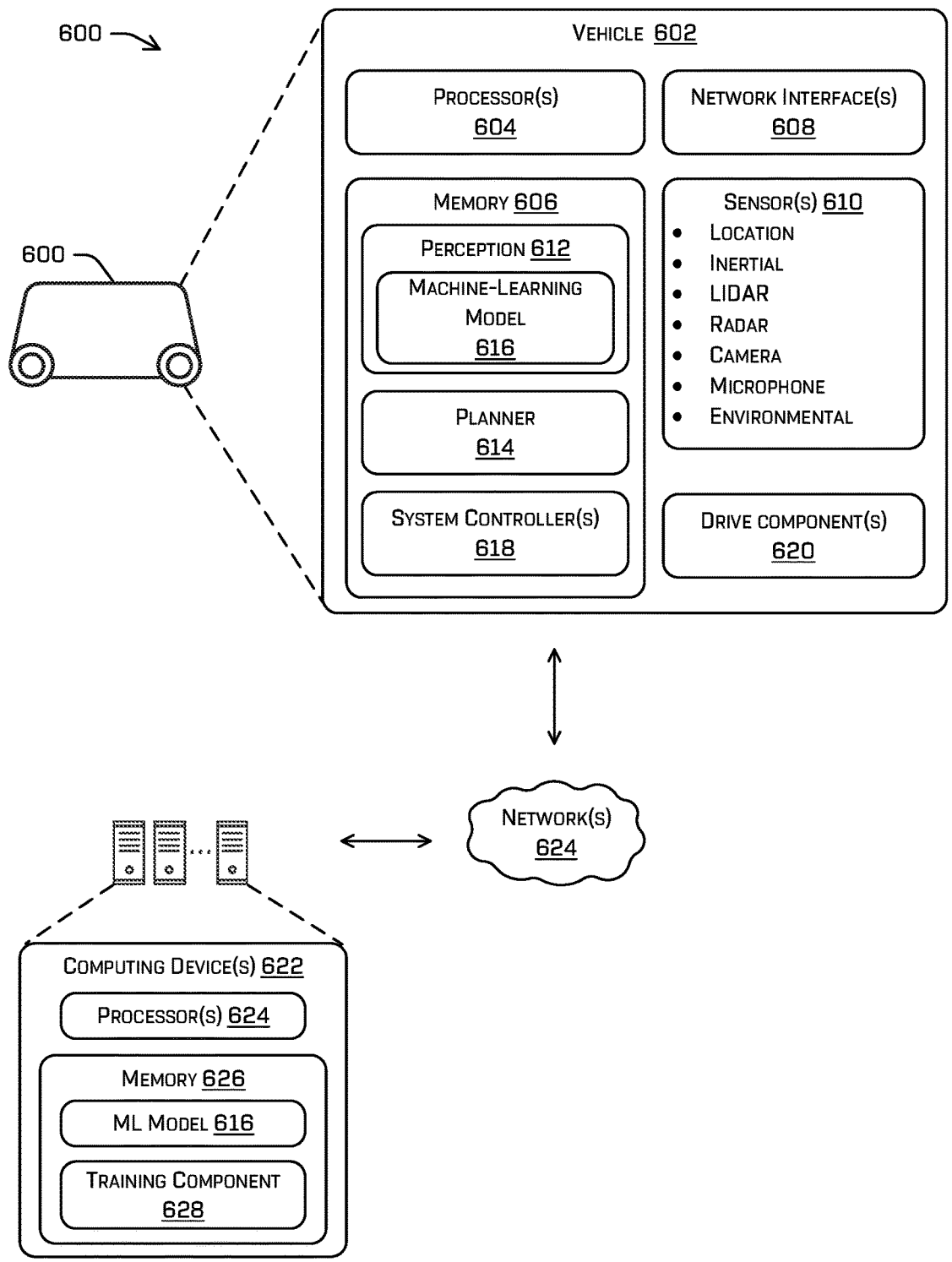
FIG. 6 illustrates a block diagram of an example system for identifying false returns and/or false detections and/or suppressing a false return and/or false detection.

FIG. 6 is a block diagram of an example architecture 600 including an example vehicle system 602 for controlling operation of at least one vehicle, such as an autonomous vehicle, using distances determined by a LIDAR system, according to any of the techniques discussed herein. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

In some examples, the vehicle system 602 may include processor(s) 604 and/or memory 606. These elements are illustrated in combination in FIG. 6, although it is understood that they may be separate elements of the vehicle system 602, and that components of the system may be implemented as hardware and/or software, in some examples.

Processor(s) 604 may include a uniprocessor system including one processor, or a multiprocessor system including several processors (e.g., two, four, eight, or another suitable number). The processor(s) 604 may be any suitable processor capable of executing instructions. For example, in various implementations, the processor(s) 604 may be general-purpose or embedded processors implementing any of a variety of instruction set architectures (ISAs), such as the x86, PowerPC, SPARC, or MIPS ISAs, or any other suitable ISA. In multiprocessor systems, each processor 604 may commonly, but not necessarily, implement the same ISA. In some examples, the processor(s) 604 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

The example vehicle system 602 may include memory 606. In some examples, the memory 606 may include a non-transitory computer readable media configured to store executable instructions/modules, data, and/or data items accessible by the processor(s) 604. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 602. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface(s) 608.

The example LIDAR system 100 may comprise a processor such as processor(s) 604 and/or memory such as memory 606.

Furthermore, though illustrated as a single unit in FIG. 6, it is understood that the processor(s) 604 and memory 606 may be distributed among multiple computing devices of the vehicle and/or among multiple vehicles, data centers, teleoperation centers, etc. In some examples, the processor(s) 604 and memory 606 may conduct at least some of the techniques discussed herein and the processor(s) 604 and memory 606 may include processor(s) and memory of the LIDAR system discussed herein.

The example vehicle system 602 may include network interface(s) 608 configured to establish a communication link (i.e., "network") between the vehicle system 602 and one or more other devices. In various implementations, the network interface(s) 608 may support communication via wireless general data networks, such as a Wi-Fi network, and/or telecommunications networks, such as, for example, cellular communication networks, satellite networks, and the like. In some examples, the sensor data discussed herein, such as a received signal, TDOA, depth measurement, output signal(s), return(s), and/or detection(s), etc., may be received at a first vehicle and transmitted to a second computing device. In some examples, at least some of the components of the LIDAR may be located at different devices. For example, a first vehicle may include the light emitter and light sensor and may generate the received signal, but may transmit the received signal to a second vehicle and/or remote computing device.

The example vehicle system 602 may include sensor(s) 610, for example, configured to localize the vehicle system 602 in an environment, to detect one or more objects in the environment, to sense movement of the example vehicle system 602 through its environment, sense environmental data (e.g., ambient temperature, pressure, and humidity), and/or sense conditions of an interior of the example vehicle system 602 (e.g., passenger count, interior temperature, noise level). The sensor(s) 610 may include, for example, one or more LIDAR sensors, which may represent the example LIDAR system 100 and/or components thereof; one or more cameras (e.g., RGB-cameras; intensity (grey scale) cameras; infrared cameras and/or other thermal cameras; depth cameras; stereo cameras); one or more magnetometers; one or more radar sensors; one or more sonar sensors; one or more microphones; one or more inertial sensors (e.g., accelerometers, gyroscopes); one or more GPS sensors; one or more Geiger counter sensors; one or more wheel encoders; one or more drive system sensors; a speed sensor; and/or other sensors related to the operation of the example vehicle system 602.

In some examples, the example vehicle system 602 may include a perception component 612 and/or a planner 614.

The perception component 612 may include instructions stored on memory 606 that, when executed by the processor(s) 604, configure the processor(s) 604 to receive sensor data from the sensor(s) 610 as input, which may include output signal(s), return(s), and/or detection(s) output by the LIDAR system discussed herein. In some examples, the perception component 612 may include instructions stored on memory 606 that, when executed by the processor(s) 604, configure the processor(s) 604 to determine a cloud of LIDAR points based, at least in part, on estimated output signal(s), return(s), and/or detection(s) determined according to any of the techniques discussed herein. In some examples, the perception component 612 may use the LIDAR point cloud to determine one or more of a representation of the environment surrounding the example vehicle system 602, the pose (e.g., position and orientation) of an object in the environment surrounding the example vehicle system 602, an object track associated with the object (e.g., a historic position, velocity, acceleration, and/or heading of the object over a period of time (e.g., 5 seconds)), and/or an object classification associated with the object (e.g., a pedestrian, a vehicle, a bicyclist, etc.). In some examples, perception component 612 may be configured to predict more than an object trajectory of one or more objects. For example, the perception component 612 may be configured to predict multiple object trajectories based on, for example, probabilistic determinations or multi-modal distributions of predicted positions, trajectories, and/or velocities associated with an object detected from the LIDAR point cloud.

The perception component 614 may additionally or alternatively comprise a machine-learning (ML) model, which may be trained to classify a LIDAR point as a false positive or a true positive. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

In some examples, the planner 614 may receive the LIDAR point cloud and/or any other additional information (e.g., object classifications, object tracks, vehicle pose) and use this information to generate a trajectory for controlling motion of the vehicle system 602. In some instances, the planner may transmit the trajectory to system controller(s) 618 to be converted into instructions and/or signals for operating drive component(s) 620.

In some instances, the vehicle system 602 may include one or more drive components 620. In some instances, the vehicle system 602 may have a single drive component 620. In some instances, the drive component(s) 620 may include one or more sensors to detect conditions of the drive component(s) 620 and/or the surroundings of the vehicle system 602. By way of example and not limitation, the sensor(s) of the drive component(s) 620 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, LIDAR sensors, RADAR sensors, etc. Some sensors, such as the wheel encoders may be unique to the drive component(s) 620. In some cases, the sensor(s) on the drive component(s) 620 may overlap or supplement corresponding systems of the vehicle system 602 (e.g., sensor(s) 610).

The drive component(s) 620 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 620 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 620. Furthermore, the drive component(s) 620 may also include one or more communication connection(s) that enable communication by the respective drive component with one or more other local or remote computing device(s).

In some examples, the vehicle 602 may receive the ML model 616 from remote computing device(s) 622, such as by network(s) 624. The network interface(s) 608 may include physical and/or logical interfaces for connecting the vehicle processor(s) 604, memory 606, and/or sensor(s) 610 to another computing device or a network, such as network(s) 216. For example, the network interface(s) 608 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle 602 may send sensor data, via the network(s) 624, to the computing device(s) 622 at a particular frequency, after a lapse of a predetermined period of time, in near real-time, etc. In some examples, this sensor data may comprise training data aggregated according to the techniques discussed herein. For example, the sensor data may comprise LIDAR data, image(s) (e.g., RGB, grayscale, and/or IR), and/or the like and may be accompanied with perception data (e.g., a region of interest associated with a "steam" classification detected by the perception component, an ML model 616 output).

In some examples, the computing device(s) 622 may comprise processor(s) 624 and/or memory 626. By way of example and not limitation, the processor(s) 604 and/or 624 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 606 and/or 626 may be examples of non-transitory computer-readable media. The memory 606 and/or 626 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, memory 626 may store ML model 616 and/or an updated version thereof and/or a training component 628. Training component 628 may control versioning of the ML model 616 and/or execute training data cleaning, labeling, and/or pre-processing; training; and/or testing. In some examples, the training component 628 may collect training data from one or more autonomous vehicles according to the techniques discussed herein and/or from a simulation. The training component 628 may comprise a simulator for simulating motion of a fluid and/or motion of a solid, which may be used to generate training data for training the ML model to differentiate between true positive detections associated with a solid surface and false positive detections associated with particulate matter.

It should be noted that while FIG. 6 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Processes

Figure 7:
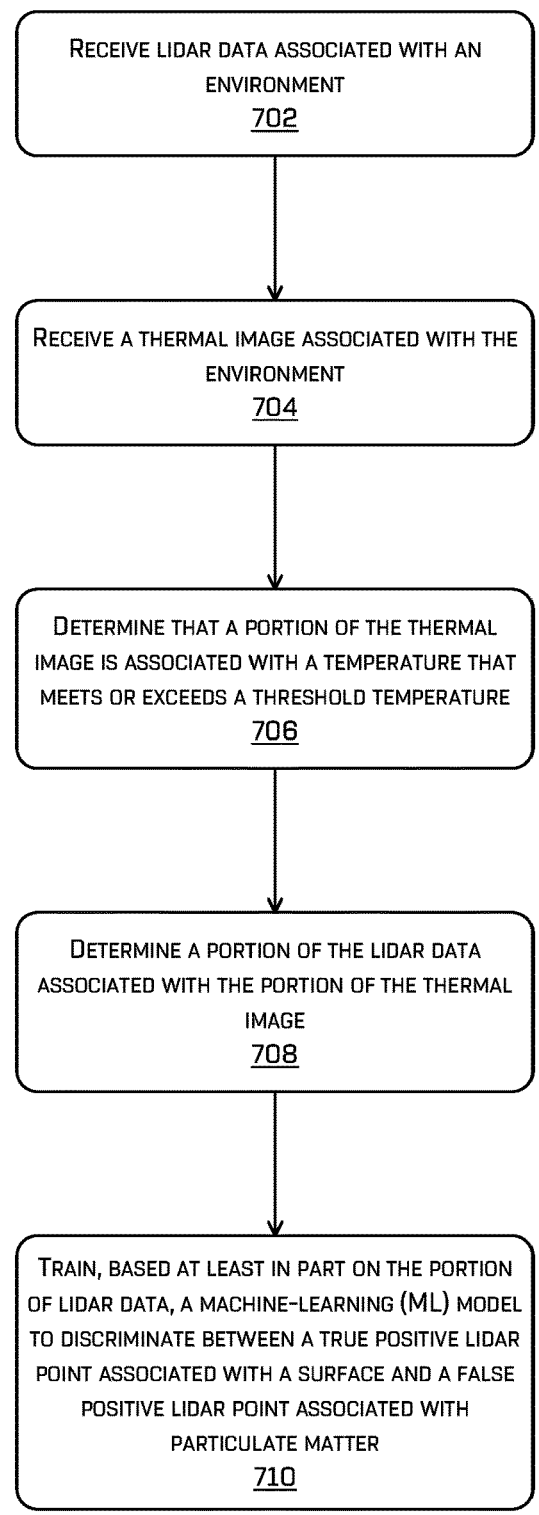
FIG. 7 illustrates a flow diagram of an example process for collecting training data for an ML model and/or training the ML model to detect a false positive LIDAR point.

FIG. 7 illustrates a flow diagram of an example process 700 for collecting training data for an ML model and/or training the ML model to detect a false positive LIDAR point. In some examples, an autonomous vehicle and/or remote computing device (e.g., distributed computing devices, such as a cloud service, and/or one or more other autonomous vehicles) may perform example process 700.

At operation 702, example process 700 may comprise receiving lidar data associated with an environment, according to any of the techniques discussed herein.

At operation 704, example process 700 may comprise receiving a thermal image associated with the environment, according to any of the techniques discussed herein. In some examples, operation 704 may additionally or alternatively comprise receiving perception data associated with the environment. For example, the perception data may comprise a region of interest (ROI) (e.g., a bounding box, a mask), a semantic segmentation, an instance segmentation, a classification, and/or the like associated with an object detected by the perception component. In some examples, the perception component may be trained to detect particulate matter, such as a dust cloud, steam, rain interference on a sensor, waves (or other smaller splashes of water), and/or the like.

At operation 706, example process 700 may comprise determining that a portion of the thermal image is associated with a temperature that meets or exceeds a threshold temperature, according to any of the techniques discussed herein. The thermal image may comprise a temperature measured by a sensor, such as an infrared camera, associated with a respective portion of the environment. In some examples, the threshold temperature may be a fixed temperature or range of temperatures, dynamically determined based at least in part on an ambient temperature of the environment, and/or dynamically determined based at least in part on temperature(s) determined by one or more sensors (e.g., based at least in part on a distribution of temperature values in a thermal image, temperature(s) determined by a thermometer). Operation 706 may additionally or alternatively comprise determining that a portion of perception data is associated with particulate matter. For example, the perception data, such as an ROI, semantic segmentation, instance segmentation, and/or the like may be associated with a particulate matter classification (e.g., steam, dust cloud).

In some examples, operation 706 may additionally or alternatively comprise determining an ROI of a thermal image associated with an outlier temperature. Determining the ROI may comprise search and/or clustering algorithms for identifying a portion of a thermal image that is an outlier. For example, determining the ROI may comprise determining a region of the thermal image associated with temperatures that are a standard deviation or more from a mean temperature of the image and/or a mean ambient temperature measured by a thermometer. In some examples, another ML model trained to identify such regions may receive the thermal image as input and output the ROI.

At operation 708, example process 700 may comprise determining a portion of the lidar data associated with the portion of the thermal image (and/or the perception data indicating particulate matter), according to any of the techniques discussed herein. Operation 708 may comprise projecting a (three or more dimensional) lidar point into an image space associated with the thermal image and determining that the projected lidar point is within the portion of the thermal image. Operation 708 may additionally or alternatively comprise determining a portion of lidar data associated with perception data that indicates that particulate matter has been detected. For example, this may comprise projecting the lidar data into an image space and determining (projected) lidar points are associated with a semantic segmentation, instance segmentation, and/or ROI associated with a classification indicating that particulate matter was detected. Operation 708 may additionally or alternatively comprise determining a distance of the projected lidar point from the portion of the thermal image (and/or from a nearest portion of perception data) and including the projected lidar point in the portion of lidar data if the distance is less than a threshold distance.

At operation 710, example process 700 may comprise training a machine-learning (ML) model based at least in part on the portion of lidar data, according to any of the techniques discussed herein. In some examples, a computing device (e.g., onboard an autonomous vehicle) may iteratively collect portions of lidar data, as determined according to operations 702-708, over time and may transmit these portions of lidar data to a remote computing device. In some examples, the computing device may additionally or alternatively transmit a thermal image and/or perception data in association with a portion of lidar data transmitted by the computing device. In some examples, the remote computing device may train the ML model to classify a lidar point as a false positive (e.g., associated with particulate matter) or as a true positive (e.g., associated with a surface) using the portions of lidar data (and/or thermal image(s) and/or perception data) as training data. In some examples, the ML model may be trained to receive lidar data as input; lidar data and thermal data as input; lidar data and perception data as input; and/or lidar data, thermal data, and perception data as input. The training data may additionally or alternatively comprise lidar data, thermal images, and/or perception data associated with surfaces (i.e., true positives). In some examples, the remote computing device may transmit a trained (and/or updated) ML model to an autonomous vehicle based at least in part on the techniques discussed herein.

In an additional or alternate example, the training data may comprise simulated data. For example, a simulator may simulate motion of a fluid (e.g., a water and/or dust suspension in air, rain droplets in air) and/or motion of a solid surface. In some examples, the simulation may supplement or replace the training data discussed above. In such a supplementation, the simulated data may comprise edge cases, such as up to hurricane force wind conditions; water that should be treated as a solid surface, such as large waves, instead of as a false positive; insect swarms; and/or the like.

In some examples, one or more frames of sensor and/or simulated data may be provided to the ML model. For example, a sequence of returns may be input into such a model (and/or such a model may comprise a "memory," such as in the form of a recurrent neural network, for example using Long-Short Term Memory structures) so that such particle motion may be discerned by the model. The ML model may, at run-time, receive one or more frames of sensor data and output an indication that one or more portions of the sensor data are associated with a false positive associated with particulate matter.

Figure 8:
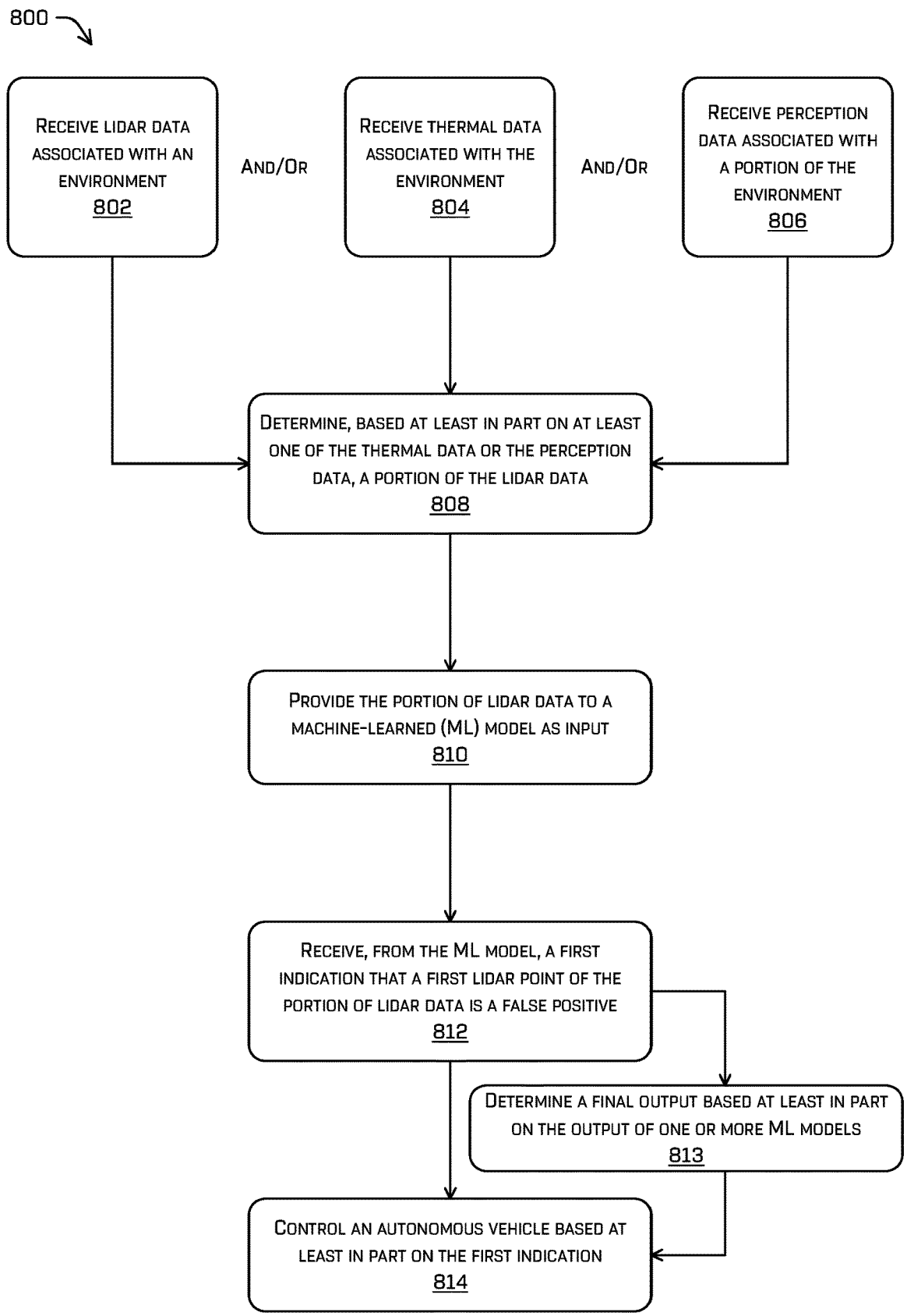
FIG. 8 illustrates a flow diagram of an example process for detecting a false positive LIDAR point using an ML model and based at least in part on thermal data and/or perception data.

FIG. 8 illustrates a flow diagram of an example process 800 for detecting a false positive LIDAR point using an ML model and based at least in part on thermal data and/or perception data.

At operation 802, example process 800 may comprise receiving lidar data associated with an environment, according to any of the techniques discussed herein.

At operation 804, example process 800 may additionally or alternatively comprise receiving thermal data associated with the environment, according to any of the techniques discussed herein. For example, the thermal data may comprise one or more temperatures measured by a thermometer and/or a thermal image captured by an infrared or other thermal camera.

At operation 806, example process 800 may additionally or alternatively comprise receiving perception data associated with a portion of the environment, according to any of the techniques discussed herein.

At operation 808, example process 800 may comprise determining, based at least in part on the thermal data and/or the perception data, a portion of the lidar data, according to any of the techniques discussed herein. For example, operation 808 may comprise operation(s) 706 and/or 708. In an additional or alternate example, example process 800 may omit operation 808. In other words, instead of identifying lidar data that may be associated with particulate matter or another source of false positives, example process 800 may skip to operation 810. In some examples, determining the lidar portion may comprise determining a portion of the environment and/or a portion of lidar data associated with a trajectory of an autonomous vehicle (e.g., lidar points that are within or near a driving corridor associated with the trajectory).

At operation 810, example process 800 may comprise providing the portion of lidar data as input to the ML model, according to any of the techniques discussed herein. Operation 810 may additionally or alternatively comprise providing additional sensor data, at least a portion of thermal data, and/or at least a portion of perception data as input to the ML model (e.g., a portion associated with the portion of lidar data). In an example that omits operation 808, the lidar portion may be associated with a trajectory of an autonomous vehicle and/or operation 810 may comprise providing, to the ML model, up to all lidar data of an available field of view of one or more lidar sensors. In some examples, inputting the sensor data may comprise providing any of the data discussed herein as input. For example, the input data may comprise a return pulse width, a return pulse power, and/or an indication of whether the return pulse was first-in-time, last-in-time, or otherwise identified according to the techniques discussed herein (e.g., a return pulse that is next-in-time following a pulse that was suppressed according to the techniques discussed herein). The input data may comprise one or more sensor data points.

In some examples, operation 812 may additionally or alternatively comprise inputting the lidar data to multiple ML models. The multiple ML models may be trained to discriminate between particulate matter and a different classification. In some examples, each ML model of the multiple ML models may be trained to output a likelihood that the sensor data is a false positive (e.g., particulate matter) or a particular classification on which the ML model was trained. For example, one ML model may be trained to discriminate between particulate matter and pedestrians, another may discriminate between particulate matter and vehicles, another may discriminate between particulate mater and signage, etc. Such an ML model may be trained using lidar data that associated with particulate matter, lidar data associated with the classification for which the ML model is being trained to discriminate, and labels associated therewith (e.g., a semantic or instance segmentation). All other data may be indicated as being "nonce" data. In other words, the ML model may detect when particulate matter or an object associated with the classification is present in the lidar data. In some examples, such an ML model may output a confidence score in association with a sensor data point indicating that the sensor data point is associated with particulate matter or as being associated with the classification for which the ML model is trained. In some instances, the ML model may comprise two outputs—a first confidence score indicating a likelihood (e.g., posterior probability) that a sensor data point (or a collection of sensor data points) is(are) associated with particulate matter and a second confidence score indicating a likelihood that the sensor data point (or the collection of sensor data points) is(are) associated with the classification. In some examples, the confidence score may be indicated as a logit. In such an example, if the first confidence score and second confidence score are both beneath a threshold, the lidar data may not be associated with either particulate matter or the classification for which the ML model is trained.

For example, lidar data associated with a vehicle may be input to a first ML model trained to discriminate between particulate matter and pedestrians and a second ML model trained to discriminate between particulate matter and vehicles. The first ML model may output a first confidence score (e.g., particulate matter confidence) and a second confidence score (e.g., pedestrian confidence) that are both beneath a threshold confidence score. On the other hand, the second ML model may output a first confidence score (e.g., particulate matter confidence) that is below the threshold confidence score, but a second confidence score (e.g., vehicle confidence) that meets or exceeds the threshold confidence score.

In an additional or alternate example, the binary classifier ML model(s) may be trained to output a single bimodal confidence score, where a first mode of the score is associated with particulate matter (e.g., −1 in a confidence score ranging from −1 to 1) and a second mode of the score is associated with the classification (e.g., 1 in a confidence score ranging from −1 to 1).

At operation 812, example process 800 may comprise receiving, from the ML model, a first indication that a first lidar point of the portion of lidar data is a false positive, according to any of the techniques discussed herein. The ML model may additionally or alternatively indicate that another lidar point is a true positive (e.g., associated with a surface/solid). In some examples, the ML model may additionally or alternatively indicate a confidence associated with an indication that a lidar point is a false positive. For example, the confidence may comprise a covariance and/or posterior probability. In some examples, the ML model may indicate that a collection of lidar points is associated with a false positive or a true positive. For example, the collection may be a subset of sensor data provided as input.

Operation 812 may additionally or alternatively comprise receiving an indication that a lidar point (or collection of lidar points) is associated with a false positive or a true positive (e.g., a particular classification) from multiple ML models, in an example where the lidar data is provided as input to multiple ML models, where each ML model is trained to be a binary classifier, discriminating between false positives and a particular class. In such an instance, example process 800 may further comprise operation 813.

At operation 813, example process 800 may comprise determining a final output based at least in part on the output of one or more ML models of the multiple ML models, according to any of the techniques discussed herein. In examples where the ML models output the confidence scores discussed above as logits, operation 813 may comprise determining a softmax or other normalization of the outputs. Other normalizations may comprise fitting the data to a probability distribution, such as a bimodal distribution (e.g., in an example where the ML model(s) output a bimodal confidence score), a Poisson distribution, a Gaussian distribution, and/or the like. Operation 813 may comprise determining the final output based at least in part on a maximum confidence score output by one of the multiple ML models (e.g., after normalization).

At operation 814, example process 800 may comprise controlling an autonomous vehicle based at least in part on the first indication, according to any of the techniques discussed herein.

Example Clauses

A. A method comprising: receiving, from a LIDAR device, a first output signal associated with a first distance; identifying, as a first return, a first portion of the first output signal that meets or exceeds a detection threshold; identifying the first portion as a false positive return based at least in part on at least one of: determining a similarity of the first portion to an emitted light pulse or an expected return signal; determining a variance of the first portion over time; determining a difference between a power spectrum of the return relative to an expected power spectrum of an expected return signal; or determining that a duration associated with the first portion meets or exceeds a threshold duration; and outputting, as a false detection, at least one of a first distance measurement, an uncertainty, or an identification of the first portion as being a false positive return.

B. The method of paragraph A, further comprising: receiving a second output signal associated with a second distance; and identifying, as one or more second returns, one or more portions of the second output signal that meet or exceed the detection threshold.

C. The method of paragraph A or B, further comprising: emitting a first light pulse, the first light pulse comprising a first power and first duration; and emitting a second light pulse comprising a second power and a second duration, wherein at least one of the second power differs from the first power or the second duration differs from the first duration, wherein the first output signal is associated with the first light pulse and the second output signal is associated with the second light pulse.

D. The method of any one of paragraphs A-C, wherein identifying the first portion as a false positive further comprises at least one of: determining a spectral representation based at least in part on the first distance and the second distance; determining at least one of a number of frequencies or a power associated with a frequency represented in the spectral representation; determining a distribution of distances associated with the LIDAR device relative to a mean of the first distance, the second distance, and one or more additional distances; or determining that a distance between a first point associated with the first distance and a second point associated with the second distance meets or exceeds a threshold distance.

E. The method of any one of paragraphs A-D, further comprising controlling an autonomous vehicle based at least in part on the first distance measurement.

F. The method of any one of paragraphs A-E, further comprising: receiving a thermal image, wherein identifying the first return as a false positive return is further based at least in part on determining that a portion of the thermal image is associated with an outlier temperature.

G. A system comprising: one or more processors; and a memory storing processor-executable instructions that, when executed by the one or more processors, cause the system to perform operations comprising: receiving, from a LIDAR device, a first output signal associated with a first distance; identifying, as a first return, a first portion of the first output signal; identifying the first portion as a false positive return based at least in part on at least one of: determining a similarity of the first portion to an emitted light pulse or an expected return signal; determining a variance of the first portion over time; determining a difference between a power spectrum of the return relative to an expected power spectrum of an expected return signal; or determining that a duration associated with the first portion meets or exceeds a threshold duration; and outputting, as a false detection, at least one of a first distance measurement, an uncertainty, or an identification of the first portion as being a false positive return.

H. The system of paragraph G, wherein the operations further comprise: receiving a second output signal associated with a second distance; and identifying, as one or more second returns, one or more portions of the second output signal that meet or exceed the detection threshold.

I. The system of paragraph G or H, wherein the operations further comprise: emitting a first light pulse, the first light pulse comprising a first power and first duration; and emitting a second light pulse comprising a second power and a second duration, wherein at least one of the second power differs from the first power or the second duration differs from the first duration, wherein the first output signal is associated with the first light pulse and the second output signal is associated with the second light pulse.

J. The system of any one of paragraphs G-I, wherein the operations further comprise: identifying, as a true positive return, a last return of the one or more second returns that is last-in-time; identifying, as a true positive return, a second return of the one or more second returns that is associated with a second similarity that meets or exceeds a similarity threshold, a second variance that is less than the variance threshold, and/or a second duration that is less than the threshold duration; or identifying, as a false positive, a third return of the one or more second returns that is associated with third similarity that is less than the similarity threshold, a third variance that is meets or exceeds the variance threshold, and/or a third duration that meets or exceeds the threshold duration.

K. The system of any one of paragraphs G-J, wherein identifying the first portion as a false positive further comprises at least one of: determining a spectral representation based at least in part on the first distance and the second distance; determining at least one of a number of frequencies or a power associated with a frequency represented in the spectral representation; determining a distribution of distances associated with the LIDAR device relative to a mean of the first distance, the second distance, and one or more additional distances; or determining that a distance between a first point associated with the first distance and a second point associated with the second distance meets or exceeds a threshold distance.

L. The system of any one of paragraphs G-K, wherein the operations further comprise: receiving a thermal image, wherein identifying the first return as a false positive return is further based at least in part on determining that a portion of the thermal image is associated with an outlier temperature.

M. The system of any one of paragraphs G-L, wherein the threshold duration is based at least in part on a duration associated with a signal transmitted by the LIDAR device.

N. A non-transitory computer-readable medium storing computer-executable instructions that, when executed by one or more processors, cause the one or more processors to perform operations comprising: receiving, from a LIDAR device, a first output signal associated with a first distance; identifying, as a first return, a first portion of the first output signal; identifying the first portion as a false positive return based at least in part on at least one of: determining a similarity of the first portion to an emitted light pulse or an expected return signal; determining a variance of the first portion over time; determining a difference between a power spectrum of the return relative to an expected power spectrum of an expected return signal; or determining that a duration associated with the first portion meets or exceeds a threshold duration; and outputting, as a false detection, at least one of a first distance measurement, an uncertainty, or an identification of the first portion as being a false positive return.

O. The non-transitory computer-readable medium of paragraph N, wherein the operations further comprise: receiving a second output signal associated with a second distance; and identifying, as one or more second returns, one or more portions of the second output signal that meet or exceed the detection threshold.

P. The non-transitory computer-readable medium of paragraph O, wherein the operations further comprise: emitting a first light pulse, the first light pulse comprising a first power and first duration; and emitting a second light pulse comprising a second power and a second duration, wherein at least one of the second power differs from the first power or the second duration differs from the first duration, wherein the first output signal is associated with the first light pulse and the second output signal is associated with the second light pulse.

Q. The non-transitory computer-readable medium of paragraph O or P, wherein the operations further comprise: identifying, as a true positive return, a last return of the one or more second returns that is last-in-time; identifying, as a true positive return, a second return of the one or more second returns that is associated with a second similarity that meets or exceeds a similarity threshold, a second variance that is less than the variance threshold, and/or a second duration that is less than the threshold duration; or identifying, as a false positive, a third return of the one or more second returns that is associated with third similarity that is less than the similarity threshold, a third variance that is meets or exceeds the variance threshold, and/or a third duration that meets or exceeds the threshold duration.

R. The non-transitory computer-readable medium of any one of paragraphs N-Q, wherein identifying the first portion as a false positive further comprises at least one of: determining a spectral representation based at least in part on the first distance and the second distance; determining at least one of a number of frequencies or a power associated with a frequency represented in the spectral representation; determining a distribution of distances associated with the LIDAR device relative to a mean of the first distance, the second distance, and one or more additional distances; or determining that a distance between a first point associated with the first distance and a second point associated with the second distance meets or exceeds a threshold distance.

S. The non-transitory computer-readable medium of any one of paragraphs N-R, wherein the operations further comprise: receiving a thermal image, wherein identifying the first return as a false positive return is further based at least in part on determining that a portion of the thermal image is associated with an outlier temperature.

T. The non-transitory computer-readable medium of any one of paragraphs N-S, wherein the operations further comprise controlling an autonomous vehicle based at least in part on the first distance measurement.

U. A method comprising: receiving first sensor data associated with an environment; receiving second sensor data associated with the environment, the second sensor data associated with a different sensor type than the first sensor data; determining a portion of the first sensor data associated with at least part of the second sensor data, the at least part of the second sensor data being associated with estimated particulate matter; inputting the portion of the first sensor data into a machine-learned (ML) model; receiving, from the ML model, an indication that the portion is associated with a false negative associated with particulate matter; and altering one or more parameters of the machine learning model based at least in part on the indication and the portion of the first sensor data.

V. The method of paragraph U, wherein the second sensor data comprises a thermal image and the method further comprises: determining a region of interest of the thermal image, the region of interest associated with an outlier temperature, wherein determining that the portion of the first sensor data is associated with the second sensor data comprises determining that the sensor data is associated with the region of interest.

W. The method of either paragraph U or V, further comprising: receiving an image associated with the environment; determining, based at least in part on a second ML model, that a portion of the image is associated with particulate matter; and associating a label with the portion of the first sensor data, the label indicating the portion of the first sensor data as comprising a false positive lidar point associated with particulate matter.

X. The method of any one of paragraphs U-W, wherein the first sensor data comprises depth data and the second sensor data comprises at least one of a thermal image or an image; and the method further comprises controlling an autonomous vehicle based at least in part on the indication.

Y. The method of any one of paragraphs U-X, further comprising: causing display of the portion of first sensor data and at least the portion of the thermal image; receiving an indication that the portion of lidar data is associated with a false positive; and associating the first sensor data with a false positive label, wherein the altering is based at least in part on the false positive label.

Z. The method of any one of paragraphs U-Y, wherein the second sensor data comprises simulated data, the simulated data being simulated based at least in part on a fluid dynamics model.

AA. A non-transitory computer-readable medium storing computer-executable instructions that, when executed by one or more processors, cause the one or more processors to perform operations comprising: receiving sensor data associated with an environment, the sensor data indicating one or more depth measurements; providing at least a portion of the sensor data to a machine-learned (ML) model as input; receiving, from the ML model, an indication that the portion comprises a false positive associated with particulate matter; and controlling an autonomous vehicle based at least in part on the indication.

AB. The non-transitory computer-readable medium of paragraph AA, wherein: receiving the sensor data comprises receiving thermal data, the thermal data indicating a temperature associated with a location in the environment; and the operations further comprise determining, based at least in part on the thermal data, the portion of the sensor data.

AC. The non-transitory computer-readable medium of paragraph AA or AB, wherein the sensor data comprises at least one of lidar data or radar data.

AD. The non-transitory computer-readable medium of any one of paragraphs AA-AC, wherein determining the portion of the sensor data comprises determining a portion of the thermal data that is associated with an outlier temperature.

AE. The non-transitory computer-readable medium of any one of paragraphs AA-AD, wherein the operations further comprise adding at least one of a portion of the thermal data, the portion of the sensor data, or the indication to a training data set for training the ML model.

AF. The non-transitory computer-readable medium of paragraph AE, the operations further comprising: transmitting the training data set; and receiving an updated ML model based at least in part on the training data set.

AG. The non-transitory computer-readable medium of any one of paragraphs AA-AF, wherein the operations further comprising receiving, from the ML model, a confidence associated with the indication.

AH. The non-transitory computer-readable medium any one of paragraphs AA-AG, wherein controlling the autonomous is further based at least in part on the confidence.

AI. A system comprising: one or more processors; and a memory storing processor-executable instructions that, when executed by the one or more processors, cause the system to perform operations comprising: receiving first sensor data associated with an environment; receiving second data associated with the environment; inputting a portion of the first sensor data into a machine-learned (ML) model; receiving, from the ML model, an indication that the portion is associated with a false negative associated with particulate matter; and altering one or more parameters of the machine learning model based at least in part on the indication and the portion of the first sensor data.

AJ. The system of paragraph AI, wherein the first sensor data comprises at least one of lidar data or radar data and the second data comprises at least one of a thermal image, an image, or simulated data.

AK. The system of paragraph AI or AJ, wherein the operations further comprise: determining a portion of the second data that is associated with estimated particulate matter; determining the portion of the first sensor data based at least in part on the portion of the second data.

AL. The system of any one of paragraphs AI-AK, wherein: the second data comprises the thermal image; the portion of the second data is a portion of the thermal image; and determining the portion of the second data comprises: determining the portion of the thermal image is associated with an outlier temperature.

AM. The system of any one of paragraphs AI-AL, wherein the operations further comprise transmitting the model to a vehicle configured to control based on the output.

AN. The system of any one of paragraphs AI-AM, wherein the operations further comprise: generating training data based at least in part on simulating motion of particulate matter by a fluid dynamics model; and altering one or more parameters of the machine learning model based at least in part on the training data.

AO. An autonomous vehicle comprising: one or more processors; and a memory storing processor-executable instructions that, when executed by the one or more processors, cause the autonomous vehicle to perform operations comprising any one of the methods recited by paragraphs A-F or U-Z AP. A system comprising: one or more processors; and a memory storing processor-executable instructions that, when executed by the one or more processors, cause the system to perform operations comprising any one of the methods recited by paragraphs A-F or U-Z.

AQ. A non-transitory computer-readable medium comprising processor-executable instructions that, when executed by the one or more processors, cause the one or more processors to perform operations comprising any one of the methods recited by paragraphs A-F or U-Z.

AR. A system comprising: one or more processors; and the non-transitory computer-readable medium recited by any one of paragraphs N-T or AA-AH.

AS. The system of paragraph AR being part of an autonomous vehicle.

While the example clauses described above are described with respect to one particular implementation, it should be understood that, in the context of this document, the content of the example clauses can also be implemented via a method, device, system, computer-readable medium, autonomous vehicle, and/or another implementation. Additionally, any of examples A-AS may be implemented alone or in combination with any other one or more of the examples A-AS.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving, from a sensor of a LIDAR device responsive to light incident on the sensor, a first output signal associated with a first distance;
   identifying, as a first return, a first portion of the first output signal that meets or exceeds a detection threshold;
   identifying the first portion as a false positive return based at least in part on at least one of:
      determining a similarity of the first portion of the first output signal that meets or exceeds a detection threshold to an emitted light pulse or an expected return signal;
      determining a variance of the first portion of the first output signal that meets or exceeds the detection threshold over time;
      determining a difference between a power spectrum of the first return relative to an expected power spectrum of the expected return signal; or
      determining that a duration associated with the first portion of the first output signal that meets or exceeds the detection threshold meets or exceeds a threshold duration; and
   outputting, as a false detection, at least one of a first distance measurement, an uncertainty, or an identification of the first portion of the first output signal that meets or exceeds the detection threshold as being a false positive return.

2. The method of claim 1, further comprising:
   receiving a second output signal associated with a second distance; and
   identifying, as one or more second returns, one or more portions of the second output signal that meet or exceed the detection threshold.

3. The method of claim 2, further comprising:
   emitting a first light pulse, the first light pulse comprising a first power and first duration; and
   emitting a second light pulse comprising a second power and a second duration, wherein at least one of the second power differs from the first power or the second duration differs from the first duration,
   wherein the first output signal is associated with the first light pulse and the second output signal is associated with the second light pulse.

4. The method of claim 2, wherein identifying the first portion as a false positive further comprises at least one of:
   determining a spectral representation based at least in part on the first distance and the second distance;
   determining at least one of a number of frequencies or a power associated with a frequency represented in the spectral representation;
   determining a distribution of distances associated with the LIDAR device relative to a mean of the first distance, the second distance, and one or more additional distances; or
   determining that a distance between a first point associated with the first distance and a second point associated with the second distance meets or exceeds a threshold distance.

5. The method of claim 1, further comprising controlling an autonomous vehicle based at least in part on the first distance measurement.

6. The method of claim 1, further comprising:
   receiving a thermal image,
   wherein identifying the first return as the false positive return is further based at least in part on determining that a portion of the thermal image is associated with an outlier temperature.

7. A system comprising:
   one or more processors; and
   a memory storing processor-executable instructions that, when executed by the one or more processors, cause the system to perform operations comprising:

receiving, from a LIDAR device, a first output signal associated with a first distance;
identifying, as a first return, a first portion of the first output signal;
identifying the first portion as a false positive return based at least in part on at least one of:
determining a similarity of the first portion to an emitted light pulse or an expected return signal;
determining a variance of the first portion over time;
determining a difference between a power spectrum of the first return relative to an expected power spectrum of the expected return signal; or
determining that a duration associated with the first portion meets or exceeds a threshold duration; and
outputting, as a false detection, at least one of a first distance measurement, an uncertainty, or an identification of the first portion as being a false positive return.

8. The system of claim 7, wherein the operations further comprise:
receiving a second output signal associated with a second distance; and
identifying, as one or more second returns, one or more portions of the second output signal that meet or exceed a detection threshold.

9. The system of claim 8, wherein the operations further comprise:
emitting a first light pulse, the first light pulse comprising a first power and first duration; and
emitting a second light pulse comprising a second power and a second duration, wherein at least one of the second power differs from the first power or the second duration differs from the first duration,
wherein the first output signal is associated with the first light pulse and the second output signal is associated with the second light pulse.

10. The system of claim 9, wherein the operations further comprise:
identifying, as a true positive return, a last return of the one or more second returns that is last-in-time;
identifying, as a true positive return, a second return of the one or more second returns that is associated with a second similarity that meets or exceeds a similarity threshold, a second variance that is less than a variance threshold, and/or a third duration that is less than the threshold duration; or
identifying, as a false positive, a third return of the one or more second returns that is associated with third similarity that is less than the similarity threshold, a third variance that is meets or exceeds the variance threshold, and/or a fourth duration that meets or exceeds the threshold duration.

11. The system of claim 9, wherein identifying the first portion as a false positive further comprises at least one of:
determining a spectral representation based at least in part on the first distance and the second distance;
determining at least one of a number of frequencies or a power associated with a frequency represented in the spectral representation;
determining a distribution of distances associated with the LIDAR device relative to a mean of the first distance, the second distance, and one or more additional distances; or
determining that a distance between a first point associated with the first distance and a second point associated with the second distance meets or exceeds a threshold distance.

12. The system of claim 7, wherein the operations further comprise:
receiving a thermal image,
wherein identifying the first return as a false positive return is further based at least in part on determining that a portion of the thermal image is associated with an outlier temperature.

13. The system of claim 7, wherein the threshold duration is based at least in part on a duration associated with a signal transmitted by the LIDAR device.

14. A non-transitory computer-readable medium storing computer-executable instructions that, when executed by one or more processors, cause the one or more processors to perform operations comprising:
receiving, from a LIDAR device, a first output signal associated with a first distance;
identifying, as a first return, a first portion of the first output signal;
identifying the first portion as a false positive return based at least in part on at least one of:
determining a similarity of the first portion to an emitted light pulse or an expected return signal;
determining a variance of the first portion over time;
determining a difference between a power spectrum of the first return relative to an expected power spectrum of the expected return signal; or
determining that a duration associated with the first portion meets or exceeds a threshold duration; and
outputting, as a false detection, at least one of a first distance measurement, an uncertainty, or an identification of the first portion as being a false positive return.

15. The non-transitory computer-readable medium of claim 14, wherein the operations further comprise:
receiving a second output signal associated with a second distance; and
identifying, as one or more second returns, one or more portions of the second output signal that meet or exceed a detection threshold.

16. The non-transitory computer-readable medium of claim 15, wherein the operations further comprise:
emitting a first light pulse, the first light pulse comprising a first power and first duration; and
emitting a second light pulse comprising a second power and a second duration, wherein at least one of the second power differs from the first power or the second duration differs from the first duration,
wherein the first output signal is associated with the first light pulse and the second output signal is associated with the second light pulse.

17. The non-transitory computer-readable medium of claim 16, wherein the operations further comprise:
identifying, as a true positive return, a last return of the one or more second returns that is last-in-time;
identifying, as a true positive return, a second return of the one or more second returns that is associated with a second similarity that meets or exceeds a similarity threshold, a second variance that is less than a variance threshold, and/or a third duration that is less than the threshold duration; or
identifying, as a false positive, a third return of the one or more second returns that is associated with third similarity that is less than the similarity threshold, a third variance that is meets or exceeds the variance threshold, and/or a fourth duration that meets or exceeds the threshold duration.

18. The non-transitory computer-readable medium of claim 16, wherein identifying the first portion as a false positive further comprises at least one of:
- determining a spectral representation based at least in part on the first distance and the second distance;
- determining at least one of a number of frequencies or a power associated with a frequency represented in the spectral representation;
- determining a distribution of distances associated with the LIDAR device relative to a mean of the first distance, the second distance, and one or more additional distances; or
- determining that a distance between a first point associated with the first distance and a second point associated with the second distance meets or exceeds a threshold distance.

19. The non-transitory computer-readable medium of claim 14, wherein the operations further comprise:
- receiving a thermal image,
  - wherein identifying the first return as a false positive return is further based at least in part on determining that a portion of the thermal image is associated with an outlier temperature.

20. The non-transitory computer-readable medium of claim 14, wherein the operations further comprise controlling an autonomous vehicle based at least in part on the first distance.

* * * * *